(12) United States Patent
Ahmed et al.

(10) Patent No.: US 9,081,899 B2
(45) Date of Patent: Jul. 14, 2015

(54) SYSTEM AND METHOD FOR PROCESSING WEB SERVICE TEST CASES

(75) Inventors: Istiak Ahmed, Plano, TX (US); Shanmugaraja Senthilnayagam, Irving, TX (US)

(73) Assignee: Bank of America Corporation, Charlotte, NC (US)

( * ) Notice: Subject to any disclaimer, the term of this patent is extended or adjusted under 35 U.S.C. 154(b) by 288 days.

(21) Appl. No.: 13/362,824

(22) Filed: Jan. 31, 2012

(65) Prior Publication Data

US 2013/0198320 A1 Aug. 1, 2013

(51) Int. Cl.
*G06F 11/00* (2006.01)
*G06F 11/36* (2006.01)
*G06F 9/44* (2006.01)

(52) U.S. Cl.
CPC ........ *G06F 11/3684* (2013.01); *G06F 11/3664* (2013.01); *G06F 8/34* (2013.01)

(58) Field of Classification Search
CPC .............. G06F 11/263; G06F 11/3672; G06F 11/3684; G06F 11/3688; G06F 11/3692; G06F 17/30; G06F 17/30424
USPC .............. 714/32, 33, 38.1; 707/705, 758, 769
See application file for complete search history.

(56) References Cited

U.S. PATENT DOCUMENTS

| | | | | |
|---|---|---|---|---|
| 6,658,429 | B2 * | 12/2003 | Dorsett, Jr. | 707/708 |
| 2004/0181537 | A1 * | 9/2004 | Chawla et al. | 707/100 |
| 2004/0249856 | A1 * | 12/2004 | Garden et al. | 707/104.1 |
| 2008/0120521 | A1 * | 5/2008 | Poisson et al. | 714/26 |
| 2008/0295076 | A1 * | 11/2008 | McKain et al. | 717/124 |
| 2010/0192006 | A1 * | 7/2010 | Gharat et al. | 714/5 |
| 2012/0059919 | A1 * | 3/2012 | Glaser et al. | 709/223 |

* cited by examiner

*Primary Examiner* — Joseph Kudirka
(74) *Attorney, Agent, or Firm* — Michael A. Springs

(57) ABSTRACT

In an exemplary embodiment, a system may include a memory and a processor communicatively coupled to the memory. The processor is operable to receive a location for sample input data, retrieve the sample input data from the location and execute a web service, the web service processing the sample input data. The processor is further operable to receive sample output data, the sample output data generated by the web service, retrieve expected data, the expected data based in part on the sample input data and the web service, and retrieve data mapping information, the data mapping information associating a first data element from the sample output data with a second data element from the expected data. The processor is also operable to compare the sample output data to the expected data using the data mapping information and store the result of the comparison of the sample output data.

21 Claims, 10 Drawing Sheets

| Test Name | Description | Step Name | Step Instruction | Expected |
|---|---|---|---|---|
| UI 1 | verify UI | Step 1 | launchApp("http://location:8000/Mod/default.aspx","application launched") | application launched |
| UI 1 | verify UI | Step 2 | login("login","password","application launched") | application launched |
| UI 1 | verify UI | Step 3 | verifyLoanData() | |
| UI 1 | verify UI | Step 4 | logout("Logged out") | Logged out |
| UI 1 | verify UI | Step 5 | closeApp("application closed") | application closed |

| Test Name | Description | Step Name | Step Instruction |
|---|---|---|---|
| UI 1 | verify UI | Step 1 | OPEN_BROWSER("web address") |
| UI 1 | verify UI | Step 2 | CLICK("Maps") |
| UI 1 | verify UI | Step 3 | CLICK("mapsSearchBox") |
| UI 1 | verify UI | Step 4 | ENTER_TEXT("india") |
| UI 1 | verify UI | Step 5 | PRESS_ENTER() |
| UI 1 | verify UI | Step 5 | CLOSE_BROWSER() |

702 704 706 708

710a 710b 710c 710d 710e 710f

Actions Table (800)

| actionName | object | parameter | Hint |
|---|---|---|---|
| CLICK | y | | |
| ENTER_TEXT | | y | Text to enter in the object |
| ENTER_PASSWORD | | | |
| DOUBLE_CLICK | y | | |
| SLEEP | | y | Wait time |
| POPUP | | | |
| SELECT | y | y | Item name to select |
| OPEN_BROWSER | | y | URL |
| CLOSE_BROWSER | | | |
| SWITCH_APP | | y | App Name to switch |
| PRESS_ENTER | | | |
| PRESS_TAB | | | |
| PRESS_DOWN | | | |
| PRESS_PAGEDOWN | | | |
| PRESS_DELETE | | | |
| VERIFY_TEXT | | y | Text to verify |

*FIG. 8a*

Objects Table (850)

| Type | BrowserName | PageName | objType |
|---|---|---|---|
| newSearchBox | name:=.*Browser.* | title:=.*News Page | WebEdit |
| search News | name:=.*Browser.* | title:=.*News Page | Image |
| mapsSearchBox | name:=.*Browser | title:=.*Maps Page | WebEdit |
| Search Maps | name:=.*Browser | title:=.*Maps Page | WebButton |
| News | name:=.*Browser | title:=.*Main Page | WebElement |
| Maps | name:=.*Browser | title:=.*Main Page | WebElement |

*FIG. 8b*

SYSTEM AND METHOD FOR PROCESSING WEB SERVICE TEST CASES

TECHNICAL FIELD OF THE INVENTION

This invention relates generally to application testing and, more specifically, to a system and process for testing web services.

BACKGROUND OF THE INVENTION

An enterprise may have a variety of computer applications and services. These computer applications and services may provide a mixture of functionality to the enterprise. The computer applications and services may process data for the enterprise. The enterprise may desire to test the functionality of the various computer applications and services to determine that data is processed correctly.

SUMMARY OF THE INVENTION

According to embodiments of the present disclose, disadvantages, and problems associated with previous data manipulation and verification systems may be reduced or eliminated.

In certain embodiments, a system may include a memory and a processor communicatively coupled to the memory. The processor is operable to receive a location for sample input data, retrieve the sample input data from the location and execute a web service, the web service processing the sample input data. The processor is further operable to receive sample output data, the sample output data generated by the web service, retrieve expected data, the expected data based in part on the sample input data and the web service, and retrieve data mapping information, the data mapping information associating a first data element from the sample output data with a second data element from the expected data. The processor is also operable to compare the sample output data to the expected data using the data mapping information and store the result of the comparison of the sample output data.

Particular embodiments of the present disclosure may provide some, none, or all of the following technical advantages. For example, certain embodiments can provide the ability for employees of an enterprise to create test case files and test various applications without possessing any programming knowledge. In such embodiments, the employees may be able to thoroughly test and verify the operation of applications without having to implement the details of a test case file. As another example, certain embodiments increase efficiency for an enterprise. In such embodiments, the time-consuming process of developing test case files and the underlying programming code is reduced greatly due to the reusable and modular nature of the embodiments. Furthermore, certain embodiments increase efficiency for an enterprise by automating the test case file generation and implementation process, accomplishing tasks that would be difficult for an employee of the enterprise to complete in a timely manner.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

For a more complete understanding of the present disclosure and its advantages, reference is made to the following descriptions, taken in conjunction with the accompanying drawings in which:

FIG. 6 illustrates example component test case data which may be used by application test system 100 of FIG. 1;

FIG. 7 illustrates example action keyword test case data which may be used by application test system 100 of FIG. 1;

FIG. 8A illustrates example action keyword data which may be used by the example system of FIG. 1;

FIG. 8B illustrates example object data which may be used by the example system of FIG. 1;

DETAILED DESCRIPTION OF THE INVENTION

Certain embodiments of the present disclosure provide techniques for creating and implementing a test case for applications. FIGS. 1 through 11 below illustrate systems and methods for creating and implementing a test case for applications.

Figure 1:
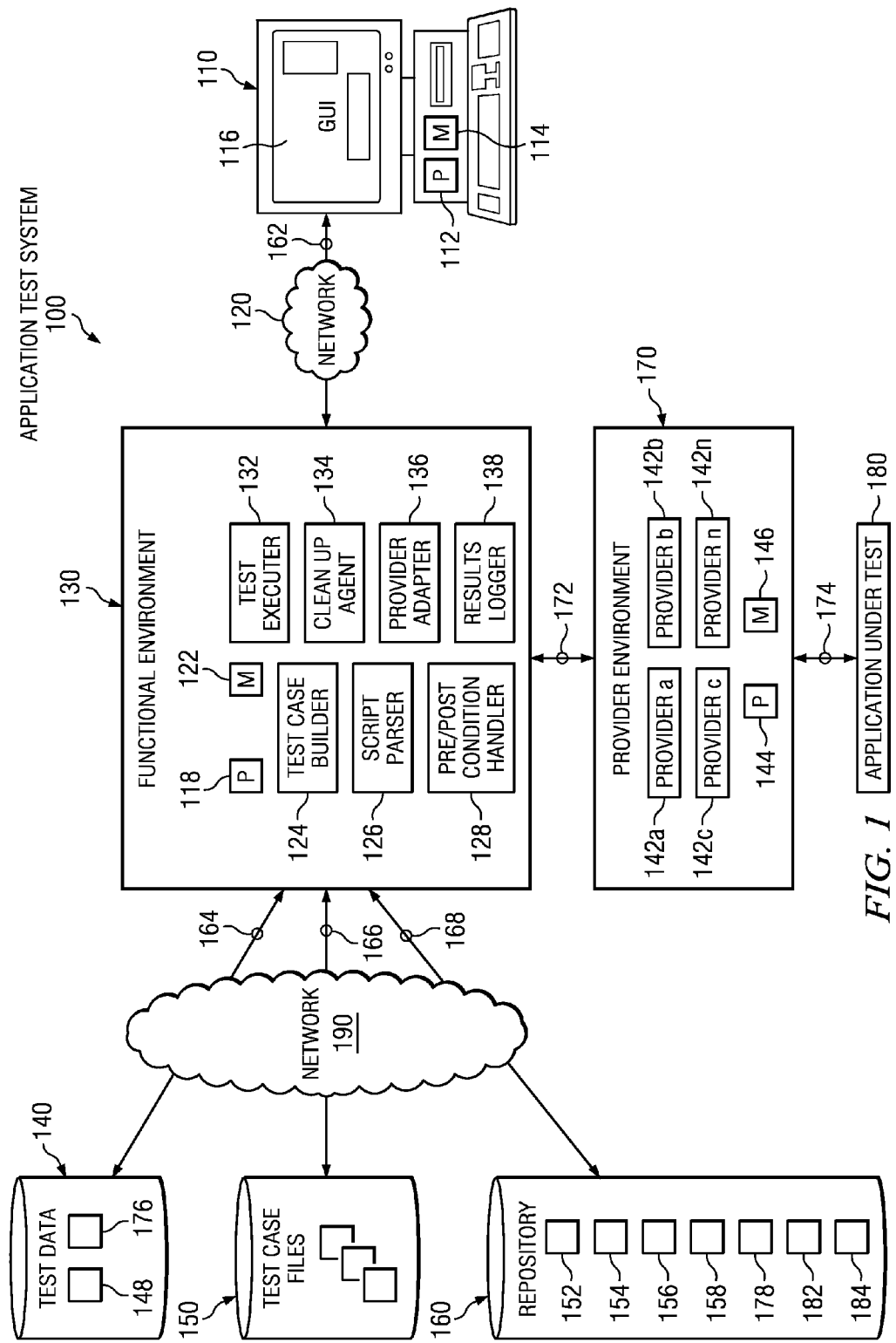
FIG. 1 illustrates an example application test system 100 according to certain embodiments.

FIG. 1 illustrates an example application test system according to certain embodiments. In general, application testing may be used by any entity that develops or uses computer applications. For example, an entity such as an enterprise may develop a computer application and desires to determine whether that computer application is functioning properly. To do this, the enterprise may employ a user or a group of users to put together a test case that will test various functionalities of the computer application. Thus, a test case comprises one or more steps that can be implemented by a user or another application to test a particular functionality of a computer application. In particular, application test system 100 comprises application under test 180, test case files 150, repository 160, application test data 140, network 190, functional environment 130, provider environment 170, network 120, and workstation 110.

Application under test 180 may be any computer application that provides a particular functionality to be tested by application test system 100. For example, application under test 180 may be a webpage or a group of webpages, software running on a computer system, software running on a mobile device, software running on any other electronic device, software running in a database system, or any other computer application suitable for a particular purpose. According to certain embodiments, application under test 180 may be a computer application utilized by customers or employees of an enterprise. In certain embodiments, application under test 180 may be a computer application used by a computer system in an enterprise environment. Although only a single application under test 180 is depicted in the illustrated example, application test system 100 is capable of testing one or more applications under test 180 as suitable for any particular purpose.

Application test system 100 may generate one or more test case files 150 to test application under test 180. Test case file 150 may be any file that contains one or more steps for testing application under test 180. In particular, each test case file 150 may comprise a test name, a test case description, one or more test case steps, instructions 154, and/or any other information suitable for testing application under test 180. The test case name may refer to a label given to a particular test case by a user, a computer application, or any other component of application test system 100. The test case description may generally describe what functionality the test case is testing. The one or more test case steps may be any data useful for implementing test case steps in a particular order. In certain embodiments, a test case step may include instruction 154. Instruction 154 may be any action that can be taken by application under test 180 or instruction 154 may represent any action that can be taken by another computer application in relation to application under test 180. Test case file 150 may be a text file, a spreadsheet, a comma separated values file, an extensible markup language file, an entry in a database, or any other format suitable for a particular purpose.

To help generate test case file 150, application test system 100 may access test case information contained in repository 160. Repository 160 may be any repository that contains elements useable to create and implement test case file 150. In certain embodiments, repository 160 may comprise components 152, instructions 154, computer logic 156, action keywords 158, objects 184, input parameters 178, hints 182, or any other element suitable for generating or implementing test case file 150. For example, repository 160 may be a relational database, a text file, a comma separated values file, a spreadsheet, or any other data structure capable of holding test case information.

Repository 160 may contain components 152. Component 152 may correspond to one or more actions for executing a particular test case step. For example, component 152 may correspond to an action taken by a user using application under test 180, a function performed by application under test 180, actions taken by another computer application in relation to application under test 180, or any other actions suitable for testing application under test 180. In certain embodiments, component 152 may correspond to instruction 154. Instruction 154 may be any piece of information stored in test case file 150 that associates component 152 to a particular test case step in test case file 150. According to some embodiments, component 152 may be the same as instruction 154.

Repository 160 may also contain action keywords 158. Action keyword 158 may represent a particular action that may be taken by a user using application under test 180, a particular action taken by application under test 180, a particular action taken by a computer application in relation to application under test 180, or a particular action taken by any other component of application test system 100 suitable for any particular purpose. Action keyword 158 may be associated with one or more objects 184. Objects 184 may be any portion of application under test 180 on or with which the action of action keyword 158 may be performed. For example, object 184 may be a portion of a computer application such as a radio button, a check box, a dialogue box, a text entry box, a dropdown menu, a link to a webpage, or any other portion of application under test 180 suitable for a particular purpose.

For certain components 152 or action keywords 158, there may be a corresponding input parameter 178. Input parameter 178 may signify that some data is needed to implement a particular component 152 or action keyword 158. For example, input parameter 178 may be data entered by a user using application under test 180, data needed by application under test 180 to execute component 152 or action keyword 158, or it may be data useable by any suitable component of application test system 100 for any particular purpose. For any particular object 184 or input parameter 178, there may be a corresponding hint 182. Hint 182 is a message to be displayed to a user to explain to the user certain details about object 184 or certain details about input parameter 178 that may guide the user to choose a particular object 184 or a particular input parameter 178.

For a particular component 152 or action keyword 158, there may be corresponding computer logic 156. Computer logic 156 may be any set of computer instructions executable by a computer system to implement a particular component 152 or a particular action keyword 158. Computer logic 156 may comprise lines of programming code, pseudocode, algorithms, machine code, or any other suitable computer instructions executable by a computer system for a particular purpose. For example, computer logic 156 may be code written in Java, C, C++, PHP, .net, COBOL, Pascal, or any other programming language. In certain embodiments, computer logic 156 may comprise a first set of computer instructions for a first environment and a second set of computer instructions for a second environment.

Application test system 100 may also include application test data 140. Application test data 140 is data that can be used to implement a particular test case step. Application test data 140 may comprise sample data 148 and user input 176. Sample data 148 may be any data that can be processed by application under test 180 or any other suitable component of application test system 100 for any particular purpose. Sample data 148 may be the contents of a file, a location of a file, data in a database, a structured query language (SQL) query, or any other data format suitable for a particular purpose. User input 176 may be any input data that a user may input during the course of the execution of a test case step or the creation of a test case step. In certain embodiments, user input 176 may correspond to input parameter 178 or object 184.

Functional environment 130 will now be discussed. Functional environment 130 may be any environment that facilitates the creation and implementation of test case file 150. In the illustrated example, functional environment 130 comprises processor 118 and memory 122. Processor 118 may include one or more microprocessors, controllers, or any other suitable computing devices or resources. Processor 118 may work, either alone or with components of application test system 100, to provide a portion or all of the functionality of application test system 100 described herein. Processor 118 communicatively couples to memory 122. Memory 122 may take the form of volatile or non-volatile memory including, without limitation, magnetic media, optical media, RAM, ROM, removable media, or any other suitable memory component. In certain embodiments, a portion or all of memory 122 may store one or more database data structures, such as one or more SQL servers or relational databases.

In certain embodiments, memory 122 may be internal or external to processor 118 and may include one or more instruction caches or one or more data caches. Instructions in the instruction caches may be copies of instructions in memory 122, and the instruction caches may speed up retrieval of those instructions by processor 118. Data in the data caches may include any suitable combination of copies of data in memory 122 for instructions executing at processor 118 to operate on, the results of previous instructions executed at processor 118 for access by subsequent instructions executing at processor 118, or for writing to memory 122, and/or any other suitable data. The data caches may speed up read or write operations by processor 118.

In certain embodiments, functional environment 130 may further comprise test case builder 124, script parser 126, condition handler 128, test executer 132, cleanup agent 134, provider adapter 136, results logger 138. Test case builder 124 may be any combination of software, hardware, and/or controlling logic capable of facilitating the creation of test case file 150. In certain embodiments, test case builder 124 may be software stored in memory 122. Test case builder 124 may include rules associated with building and implementing test case files 150. In certain embodiments, test case builder 124 may be associated with a graphical user interface that a user can interact with in order to build or implement test case file 150. Another component of functional environment 130 may include script parser 126. Script parser 126 may be any combination of software, hardware, and/or controlling logic capable of parsing test case file 150. In certain embodiments, script parser 126 is software stored in memory 122. Script parser 126 is capable of accessing test case file 150 and preparing it for implementation in provider environment 170. For example, script parser 126 may access test case file 150 and write it to a local file in preparation for implementation of test case file 150 in provider environment 170. In certain embodiments, a plurality of test case files 150 may be accessed by script parser 126 and parsed one at a time in order to implement each test case file 150 one at a time in provider environment 170.

Functional environment 130 may include condition handler 128. Condition handler 128 may be any combination of software, hardware, and/or controlling logic capable of controlling particular conditions in functional environment 130, provider environment 170, workstation 110, or any other component of application test system 100 suitable for a particular purpose. For example, condition handler 128 may be responsible for preparing an operating system, environment variables, configurations, or any other factor that may affect application under test 180 in application test system 100 in advance of implementing test case file 150. Furthermore, condition handler 128 is capable of controlling an operating system, environment variables, configurations, or any other factors affecting the operation of application under test 180 after the execution of test case file 150. For example, after the execution of test case file 150, condition handler 128 may be responsible for resetting settings of an operating system, of a database, or of a file system in application test system 100. In certain embodiments, condition handler 128 may reset various conditions of application test system 100 to a state occurring prior to the implementation of test case file 150.

Functional environment 130 may also include test executer 132. Test executer 132 may be any combination of software, hardware, and/or controlling logic capable of receiving and implementing test case 150. In certain embodiments, test executer 132 may be software stored in memory 122. Test executer 132 may include rules for processing test case file 150. For example, test executer 132 may have rules that allow it to execute each test case step one by one in test case file 150. In certain embodiments, test executer 132 is capable of implementing computer logic 156 which may be associated with a particular test case step of test case file 150. According to some embodiments, test executer 132 may be capable of determining whether a certain test case step of test case file 150 was successful or not. For example, if text executer 132 is not able to execute a particular test case step of test case file 150, it may determine that that test case step was unsuccessful.

Additionally, functional environment 130 may include cleanup agent 134. Cleanup agent 134 may be any combination of software, hardware, and/or controlling logic capable of deleting information stored in memory 122 related to the execution of test case file 150. In certain embodiments, cleanup agent 134 may be software stored in memory 122. For example, for the execution of test case file 150, functional environment 130 may have stored some temporary data in memory 122. In such an example, cleanup agent 134 would be responsible for removing the temporary data that was stored in memory 122.

Another component of functional environment 130 may be provider adapter 136. Provider adapter 136 may be any combination of software, hardware, and/or controlling logic capable of interfacing between functional environment 130 and provider environment 170. In certain embodiments, provider adapter 136 may be software stored in memory 122. Provider adapter 136 is responsible for initializing a particular automation tools provider 142 in provider environment 170 prior to the implementation of test case file 150. Provider adapter 136 may include rules for determining the appropriate automation tools provider 142 for implementation of test case file 150. In certain embodiments, certain rules regarding automation tools provider 142 may be contained in test case file 150.

Functional environment 130 may be results logger 138. Results logger 138 may be any combination of software, hardware, and/or controlling logic responsible for recording the results of each test case step of test case file 150. For example, result logger may include functionality to store output data produced by application under test 180 in a database or in a file. As another example, results logger 138 may include functionality for taking a screenshot when a particular test case step of test case file 150 has reached a failure state. Results logger 138 may also include information regarding various failure states of test case steps. In such instance, results logger 138 may associate a failure reason with a failed test case step of test case file 150.

Provider environment 170 will now be discussed. Generally, provider environment 170 is a collection of automation tools that interact with application under test 180, testing various functionalities of application under test 180. These automation tools may execute steps that may typically be performed by a user using application under test 180 or another computer application interacting with application under test 180. The automation tools perform test case steps as instructed by test case file 150. More specifically, provider environment 170 comprises processor 144, memory 146, and automation tools provider 142. Processor 144 may include one or more microprocessors, controllers, or any other suitable computing devices or resources. Processor 144 may work, either alone or with components of application test system 100, to provide a portion or all of the functionality of application test system 100 described herein. Processor 144 communicatively couples to memory 146. Memory 146 may take the form of volatile or non-volatile memory including, without limitation, magnetic media, optical media, RAM, ROM, removable media, or any other suitable memory component. In certain embodiments, a portion or all of memory 146 may store one or more database data structures, such as one or more SQL servers or relational databases.

In certain embodiments, memory 146 may be internal or external to processor 144 and may include one or more instruction caches or one or more data caches. Instructions in the instruction caches may be copies of instructions in memory 146, and the instruction caches may speed up retrieval of those instructions by processor 144. Data in the data caches may include any suitable combination of copies of data in memory 146 for instructions executing at processor 144 to operate on, the results of previous instructions executed at processor 144 for access by subsequent instructions executing at processor 144, or for writing to memory 146, and/or any other suitable data. The data caches may speed up read or write operations by processor 144.

Provider environment 170 may also include automation tools providers 142. Automation tools provider 142 may be any combination of software, hardware, and/or controlling logic capable of implementing test case steps of test case file 150. For example, automation tools provider 142 may be software stored in memory 146. In certain embodiments, automation tools provider 142 may be associated with particular computer logic 156 that allows automation tools provider 142 to implement a test case step from test case file 150. For example, automation tools provider 142*a* may be associated with particular computer logic 156 for executing a particular step of test case file 150 while automation tool provider 142*b* may have different computer logic 156 associated with executing the same step of test case file 150. Automation tools provider 142 may be software provided by a third party or it may be software developed specifically by the enterprise implementing application test system 100. Provider environment 170 is capable of handling any combination of third party or first party automation tools providers 142.

In certain embodiments, automation tool provider 142 may be operable to read test case file 150 and determine computer logic 156 associated with a particular test case step included in test case file 150. Automation tools provider 142 may have access to computer logic 156 associated with automation tools provider 142 that is stored in memory 146 or is stored in repository 160. Automation tools provider 142 is further operable to determine whether a particular test case step was successful or whether it was a failure. In certain embodiments, automation tools provider 142 may be able to determine a reason for a test case step failure. According to some embodiments, automation tools provider 142 may be associated to a particular provider environment 170 while automation tools provider 142*b* may be associated to another provider environment 170.

Any functionality of application test system 100 may be accessed by workstation 110. Generally, workstation 110 can be used by a user to create, edit, and/or implement test case files 150. More specifically, workstation 110 represents any suitable local or remote device that may be used by a user to access one or more elements of application test system 100. Workstation 110 may comprise processor 112, memory 114, and graphical user interface (GUI) 116. For example, workstation 110 may comprise a computer, telephone, internet browser, electronic notebook, personal digital assistant (PDA), pager, or any other suitable device (wireless, wireline, or otherwise), component, or element capable of receiving, processing, storing, and/or communicating information with other components of application test system 100.

Processor 112 may include one or more microprocessors, controllers, or any other suitable computing devices or resources. Processor 112 may work, either alone or with components of application test system 100, to provide a portion or all of the functionality of application test system 100 described herein. Processor 112 communicatively couples to memory 114. Memory 114 may take the form of volatile or non-volatile memory including, without limitation, magnetic media, optical media, RAM, ROM, removable media, or any other suitable memory component.

In certain embodiments, memory 114 may be internal or external to processor 112 and may include one or more instruction caches or one or more data caches. Instructions in the instruction caches may be copies of instructions in memory 134, and the instruction caches may speed up retrieval of those instructions by processor 112. Data in the data caches may include any suitable combination of copies of data in memory 114 for instructions executing at processor 112 to operate on, the results of previous instructions executed at processor 112 for access by subsequent instructions executing at processor 112, or for writing to memory 114, and other suitable data. The data caches may speed up read or write operations by processor 112.

In some embodiments, workstation 110 may comprise a graphical user interface (GUI) 116. GUI 116 is generally operable to tailor and filter data presented to a user. In certain embodiments, GUI 116 may present a user with an interface to interact with any component of functional environment 130. For example, GUI 116 may present a user with an interface to utilize test case builder 124. Using the GUI 116 a user may access the features of test case builder 124 to create, edit and/or implement a particular test case file 150. In certain embodiments, a user may be able to use workstation 110 to configure functional environment 130, provider environment 170, automation tools providers 142, application under test 180, or any other component of application test system 100. GUI 116 may provider a user with an efficient and user-friendly presentation of information regarding the various components of application test system 100. GUI 116 may comprise a plurality of displays having interactive fields, pull-down lists, and buttons operated by a user. GUI 116 may include multiple levels of abstraction, including groups and boundaries. Computer logic associated with GUI 116 may reside in memory 114, memory 122, or any other storage device suitable for a particular purpose.

Any component of application test system 100 may communicate with another component of application test system 100 using networks 120 and 190. Networks 120 and 190 facilitate wireless or wireline communication. Networks 120 and 190 may communicate, for example, IP packets, Frame Relay frames, Asynchronous Transfer Mode cells, voice, video, data, and other suitable information between network addresses. Networks 120 and 190 may include one or more personal area networks (PANs), local area networks (LANs), a wireless LAN (WLAN), a virtual private network (VPN), radio access networks (RANs), metropolitan area networks (MANs), wide area networks (WANs), mobile networks (e.g., using WiMax (802.16), WiFi (802.11), 3G, or any other suitable wireless technologies in any suitable combination), all or a portion of the global computer network known as the Internet, an extranet, a satellite network, and/or any other communication system or systems at one or more locations, any of which may be any suitable combination of wireless and wireline.

Turning to example operations of application test system 100, application test system 100 may provide at least two primary functions: the creation and editing of test case files 150 and the implementation of test case files 150.

Generally, a user may use workstation 110 to create or implement test case files 150. The user may use GUI 116 to interface with the various components of application test system 100. In particular, a user may interact with GUI 116 of workstation 110 to access various functionalities of functional environment 130. For example, a user may use GUI 116 to access test case builder 124. Workstation 110 may communicate message 162 to functional environment 130, message 162 comprising a request to access test case builder 124. In response, functional environment 130 may then grant workstation 110 access to test case builder 124.

Test case builder 124 may present a variety of information about test case files 150 that a user can then use to either create test case file 150 or implement test case file 150. A user may decide to use test case builder 124 to build test case file 150 in one of two ways: using components 152 or using action keywords 158.

A user may choose to use test case builder 124 to build test case file 150 using components 152. In certain embodiments, workstation 110 may communicate message 162 to functional environment 130. Message 162 may comprise a request to build test case file 150 using components 152. In response, functional environment 130 may facilitate communication between test case builder 124 and repository 160. For example, test case builder 124 may communicate message 168 to repository 160. Message 168 may comprise a request to access components 152. In response to message 168, test case builder 124 may have access to components 152. Once test case builder 124 has access to components 152, test case builder may facilitate the presentation of components 152 on GUI 116 of workstation 110. A user may then decide to create a first test case step of test case file 150. For example, components 152 may be presented in GUI 116 as a drop-down list, a group of radio buttons, or any other GUI component suitable for any particular purpose. In certain embodiments, a user may choose a particular component 152 by selecting it from a drop-down menu in GUI 116. In other embodiments, a user may select a particular component 152 by typing in the name of the particular component 152 in a text box in GUI 116.

Workstation 110 may communicate the user's component 152 selection to functional environment 130. In certain embodiments, this selection may be communicated by message 162 over network 120. In response to receiving the user selection, test case builder 124 may attempt to determine whether the particular component 152 is associated with a particular input parameter 178. In certain embodiments, test case builder 124 may determine whether a particular component 152 has an input parameter requirement by communicating message 168 over network 190 to repository 160. Message 168 may comprise a request to access input parameters 178. In response, test case builder 124 may have access to input parameters 178.

Test case builder 124 may use the information associated with input parameters 178, information associated with component 152, or any other information suitable for a particular purpose to determine whether component 152 is associated with a parameter requirement. In certain embodiments, if test case builder 124 determines that a parameter is associated with the selected component 152, test case builder 124 may facilitate the presentation of a request for input parameter 178 on GUI 116 of workstation 110. Once presented with the request for input parameter 178, the user may enter user input to be associated with input parameter 178. For example, GUI 116 may present a text box for parameter input to the user. The user may type in user input into the text box. In response to the user entering user input, workstation 110 may communicate the user input to functional environment 130. For example, workstation 110 may communicate user input via message 162 over network 120.

Test case builder 124 may receive user input and facilitate the association of the user input to the selected component 152 and input parameter 178. For example, test case builder 124 may create test case file 150 and associate component 152, input parameter 178, and the user input in test case file 150. As another example, test case builder 124 may communicate message 166 over network 190 to test case files 150. Message 166 may comprise a request to access a particular test case file 150. In response, test case builder 124 may access a particular test case file 150. Test case builder 124 may then associate component 152 with input parameter 178 and the received user input. In certain embodiments, component 152 may be associated with instruction 154. In such embodiments, test case builder 124 may communicate message 168 to repository 160. Message 168 may comprise a request to access instructions 154. Test case builder 124 may then determine whether a particular instruction 154 is associated with the selected component 152. Test case builder 124 may then store instruction 154 in test case file 150.

Once component information is stored in test case file 150, a user may indicate the creation of a new test case step. In response, test case builder 124 may facilitate GUI 116 to present the user with components 152. If the user indicates no more test case steps will be created, test case builder 124 may store test case file 150 along with other test case files 150. In certain embodiments, the user may indicate to test case builder 124 that test case file 150 may be stored in a location different than the location of other test case files 150. In such embodiments, test case builder 124 may store test case file 150 in that particular location.

A user may also create test case file 150 using action keywords 158. In particular, a user may be presented with GUI 116 on workstation 110 that allows the user to create a test case file 150 using action keywords 158. A user may use GUI 116 to provide application test system 100 a variety of information. For example, the user may select a particular application under test 180 from a list of applications under test 180. A user may provide a test case name for test case file 150. A user may provide a location to store test case file 150. Workstation 110 may communicate this information to functional environment 130. In certain embodiments, workstation 110 may communicate message 162 to functional environment 130. Message 162 may comprise information regarding test case file 150 that the user wishes to create or edit. In response, test case builder 124 may communicate message 168 to repository 160. Message 168 may comprise a request to access action keywords 158. In response, test case builder may have access to action keywords 158. Test case builder 124 may then present action keywords 158 to user via GUI 116 of workstation 110.

Action keywords 158 may be presented to the user as part of a drop-down list, group of radio buttons, or any other element of GUI 116 that allows a user to choose a particular action keyword 158 suitable for any particular purpose. A user may then choose to create a test case step by selecting one of the action keywords 158 presented in GUI 116. Workstation 110 may communicate the user selection to functional environment 130. In certain embodiments, the user's selection may be communicated via message 162 over network 120. In response to receiving message 162, test case builder 124 may determine whether object 184 is associated with action keyword 158. In certain embodiments, test case builder 124 may communicate message 168 over network 190 to repository 168. Message 168 may comprise a request to access objects 184. In response, test case builder 124 may have access to objects 184.

Test case builder 124 may then determine if any objects 184 are associated with action keyword 158. If test case builder 124 determines action keyword 158 may require objects 184, test case builder 124 may facilitate the display of objects 184 in GUI 116. The user is then presented with the ability to associate a particular object 184 to a particular action keyword 158. Once the user has made a selection of a particular object 184, workstation 110 may communicate that selection to functional environment 130 via message 162 over network 120. In certain embodiments, after receiving the user selection of a particular object 184, test case builder 124 may associate the particular object 184 with a particular action keyword 158 in test case file 150. According to some embodiments, test case builder 124 may determine that a particular action keyword 158 requires a parameter input. For example, test case builder 124 may communicate message 168 to repository 160. Message 168 may comprise a request to access input parameters 178. In response to message 168, test case builder 124 may access input parameters 178.

Test case builder 124 may then determine whether the selected action keyword 158 requires a particular input parameter 178. If test case builder 124 determines that the selected action keyword 158 requires a particular input parameter 178, test case builder 124 may facilitate the presentation of a request for user input for input parameter 178 on GUI 116 of workstation 110. A user may then type in user input for that particular input parameter 178.

Once the user has entered user input, workstation 110 may communicate that input to functional environment 130 via message 162. In response, test case builder 124 may associate action keyword 158 with input parameter 178 and the user input in test case file 150. In certain embodiments, there may be a hint 182 associated with a particular action keyword 158, a particular object 184, or a particular input parameter 178. For example, test case builder 124 may communicate message 168 over network 190 to repository 160. Message 168 may comprise a request to access hints 182. In response, test case builder 124 may be granted access to hints 182. Test case builder 124 may then determine that a particular action keyword 158, particular object 184, or particular input parameter 178 is associated with a particular hint 182. In response to this determination, test case builder 124 may facilitate the displaying of hint 182 in GUI 116 on workstation 110. After creating a test case step, a user may indicate that test case file 150 should be saved or another test case step may be created.

Implementation of test case file 150 will now be discussed. A user may use GUI 116 on work station 110 to initiate the implementation of test case file 150. In certain embodiments, the user may use GUI 116 to enter a location of a particular test case file 150. According to some embodiments, a user may be presented with a list of various test case files 150 and the user may choose one of the plurality of test case files 150. Once the user has made the decision to implement a particular test case file 150, workstation 110 may communicate message 162 over network 120 to functional environment 130. Message 162 may comprise a request to implement test case file 150. In certain embodiments, in response to receiving a request to implement test case file 150, script parser 126 may communicate message 166 over network 190 to test case files 150. Message 166 may comprise a request to access a particular test case file 150. In response to message 166, script parser 126 may have access to a particular test case file 150. In certain embodiments, once script parser 126 has access to a particular test case file 150, script parser 126 may write test case file 150 to a local file. For example, this local file may be stored in memory 122.

In preparation of implementing test case file 150, condition handler 128 may configure any component of application test system 100 to facilitate the implementation of test case file 150. For example, condition handler 128 may facilitate the access of application test data 140. In certain embodiments, condition handler 128 may communicate message 164 over network 190 to application test data 140. Message 164 may comprise a request to access sample data 148 and/or user input 176. In response to message 164, condition handler 128 may have access to information contained within application test data 140. Condition handler 128 may also facilitate the initialization of a particular automation tools provider 142. For example, condition handler 128 may instruct provider adapter 136 to initialize a particular automation tools provider 142. In certain embodiments, provider adapter 136 may communicate message 172 to provider environment 170. Message 172 may comprise an instruction to provider environment 170 to initialize a particular automation tools provider 142. In response to message 172, provider environment 170 may initialize the particular automation tools provider 142. In certain embodiments, initializing a particular automation tools provider 142 may comprise setting a test case execution status to "standby" in automation tools provider 142.

After script parser 126 prepares test case file 150 for implementation by application test system 100, script parser 126 may instruct test executer 132 to begin the implementation of test case file 150. Test executer 132 may implement test case file 150 by communicating test case file 150 to provider environment 170. According to some embodiments, test executer 132 may instruct provider adapter 136 to communicate message 172 to provider environment 170. Message 172 may comprise test case file 150 and an instruction to set test case execution status to "run." In response to message 172, the particular automation tools provider 142 may set execution status to "run" and may begin reading from test case file 150. Automation tools provider 142 may begin by reading test case file 150. Automation tools provider 142 may process the first test case step of test case file 150. In certain embodiments, automation tools provider 142 may retrieve any data required to implement test case file 150. For example, automation tools provider 142 may access data contained in application test data 140 such as sample data 148 or user input 176.

Furthermore, automation tools provider 142 may also convert the contents of the test case step of test case file 150 into computer logic 156 that automation tools provider 142 may implement. For example, automation tools provider 142 may extract a particular component 152 or a particular instruction 154 from a test case step from test case file 150. Automation tools provider 142 may request access to repository 160 in order to determine the proper computer logic 156 associated with the test case step. Automation tools provider 142 may accomplish this by communicating message 172 to functional environment 130 or may communicate message 172 directly to repository 160. Message 172 may comprise a request to access components 152, instructions 154, computer logic 156, action keywords 158, objects 184, input parameters 178, or any other information suitable for any particular purpose. In response, automation tools provider 142 may have access to the contents of repository 160. Once automation tools provider 142 determines the corresponding computer logic 156 for a particular test case step of test case file 150, automation tools provider 142 may begin to execute the test case step.

Automation tools provider 142 may begin to implement the particular test case step by executing computer logic 156. In certain embodiments, in response to executing computer logic 156, automation tools provider 142 may communicate message 174 to application under test 180. Message 174 may comprise an instruction or action in relation to application under test 180. In response to message 174, the test case step of test case file 150 is executed on or by application under test 180. Automation tools provider 142 may be able to determine if the test case step of test case file 150 was executed successfully or whether the test case step failed.

Once automation tools provider 142 determines the result of executing a particular test case step, it may communicate message 172 to functional environment 130. Message 172 may comprise the result of executing the test case step. In response to receiving message 172, functional environment 134 may begin to record the result. For example, functional environment 130 may utilize results logger 138 to record the result of the test case step of test case 150. In certain embodiments, results logger 138 may also take a screen shot of application under test 180. Results logger 138 may store these results in memory 122 or any other storage device of application test system 100. According to some embodiments, results logger 138 may store the results in an external file. For example, results logger 138 may store the result of test case step in test case file 150 in a spreadsheet. In other embodiments, results logger 138 may email the results of the test case step of test case file 150 to a user. After test executer 132 has executed each test case step of test case file 150, functional environment 130 may facilitate the end of the implementation of test case file 150. For example, functional environment 130 may use condition handler 128 to reset the status of any component of application test system 100. As another example, functional environment 130 may conclude the implementation of test case 150 by instructing clean-up agent 134 to delete any temporary files that may have been created by application under test 180, provider environment 170, functional environment 130, or any other component of application test system 100 suitable for any particular purpose.

Any component of application test system 100 may include an interface, logic, memory, and other suitable elements. An interface receives input, sends output, processes the input and/or output and/or performs other suitable operations. An interface may comprise hardware and/or software. Logic performs the operation of the component. For example, logic executes instructions to generate output from input. Logic may include hardware, software, and/or other logic. Logic may be encoded in one or more non-transitory media, such as a computer-readable medium or any other suitable tangible medium, and may perform operations when executed by a computer. Certain logic, such as a processor, may manage the operation of a component. Examples of a processor include one or more computers, one or more microprocessors, one or more applications, and/or other logic. Any suitable logic may perform the functions of application test system 100.

Particular embodiments of the present disclosure may provide some, none, or all of the following technical advantages. For example, certain embodiments can provide the ability for employees of an enterprise to create test case files and test various applications without possessing any programming knowledge. In such embodiments, the employees may be able to thoroughly test and verify the operation of applications without having to implement the details of a test case file. As another example, certain embodiments increase efficiency for an enterprise. In such embodiments, the time-consuming process of developing test case files and the underlying programming code is reduced greatly due to the reusable and modular nature of the embodiments. Furthermore, certain embodiments increase efficiency for an enterprise by automating the test case file generation and implementation process, accomplishing tasks that would difficult for an employee of the enterprise to complete in a timely manner.

Figure 2:
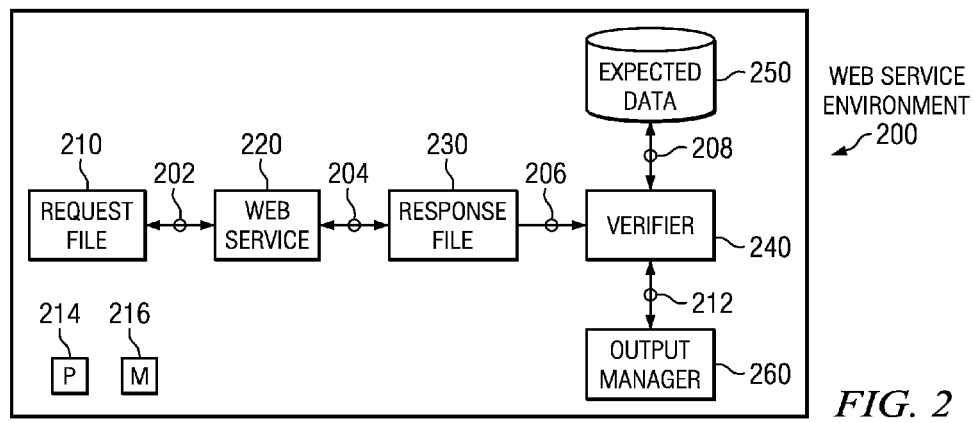
FIG. 2 illustrates an example web service test environment.

FIG. 2 illustrates an example web service test environment. In the illustrated example, web service environment 200 includes processor 214, memory 216, web service 220, request file 210, response file 230, verifier 240, expected data 250, data mapping file 270, and output manger 260. Although web service environment 200 is illustrated and primarily described as including particular components, the present disclosure contemplates web service environment 200 including any suitable components according to particular purposes.

Processor 214 may include one or more microprocessors, controllers, or any other suitable computing devices or resources. Processor 214 may work, either alone or with components of web service environment 200, to provide a portion or all of the functionality of web service environment 200 described herein. Processor 214 communicatively couples to memory 216. Memory 216 may take the form of volatile or non-volatile memory including, without limitation, magnetic media, optical media, RAM, ROM, removable media, or any other suitable memory component. In certain embodiments, a portion or all of memory 216 may store one or more database data structures, such as one or more SQL servers or relational databases.

In certain embodiments, memory 216 may be internal or external to processor 214 and may include one or more instruction caches or one or more data caches. Instructions in the instruction caches may be copies of instructions in memory 216, and the instruction caches may speed up retrieval of those instructions by processor 214. Data in the data caches may include any suitable combination of copies of data in memory 216 for instructions executing at processor 214 to operate on, the results of previous instructions executed at processor 214 for access by subsequent instructions executing at processor 214, or for writing to memory 216, and/or any other suitable data. The data caches may speed up read or write operations by processor 214.

In general, an enterprise may provide one or more web services 220 that will eventually be used by customers, other enterprises, or any other entity that may desire to use web service 220. In certain instances, an enterprise may have developed the functionality of a particular web service 220 but may not have developed a front-end interface of the particular web service 220. In such instances, an enterprise may desire to test the functionality of web service 220 without first developing a user interface for web service 220. More specifically, web service 220 may provide any functionality or group of functionalities that are desired to be tested. Web service 220 may be any combination of software, hardware and/or controlling logic that provides a particular functionality in web service environment 200. In certain embodiment, web service may be computer logic stored in memory 216.

Request file 210 may be any information useful for testing web service 220. For example, request file 210 may include sample user input data, data retrieved from a database, data retrieved from a file, or any other information suitable for a particular purpose. Request file 210 may be a text file, an extensible markup language file, a database SQL query, a comma separated values file, a spreadsheet, or any other format suitable for a particular purpose. Response file 230 may be any information produced by web service 220. For example, response file 230 may include data that was produced after web service 220 processed certain information contained in request file 210. Response file 230 may be a text file, an extensible markup language file, a database SQL query, a comma separated values file, a spreadsheet, or any other format suitable for a particular purpose. In certain embodiments, response file 230 may be stored in memory 216.

Another component of web service environment 200 is verifier 240. Generally, verifier 240 determines whether data produced by web service 220 is correct. More specifically, verifier 240 may be any combination of software, hardware, and/or controlling logic that allows web service environment 200 to determine the validity of data produced by web service 220. Verifier 240 is capable of accessing response file 230 and extracting information from response file 230 in determining whether information in response file 230 is correct. In certain embodiments, verifier 240 is capable of comparing data included in response file 230 against expected data 250. Expected data 250 is any data that is considered to be valid output of web service 220. In certain embodiments, expected data 250 may be the correct output data for web service 220 after correctly processing request file 210. Expected data 250 may be a file in memory 216, it may be a database in memory 216, a file external to web service environment 200, a database external to web service environment 200, or any other component suitable for a particular purpose.

In certain embodiments, verifier 240 may need to match data in response file 230 to data in expected data 250. In such embodiments, verifier 240 may use data mapping file 270. Generally, data mapping file 270 contains information that allows web service environment 200 to correlate data in response file 230 to information in expected data 250. For example, data mapping file 270 may be a text file, a spread sheet, an extensible mark-up language file, a database SQL query, a comma separated values file, a text file, or any other file capable of correlating information contained in response file 230 to information contained in expected data 250. In certain embodiments, data mapping file 270 may be stored in memory 216.

The results of verifier 240 may be handled by output manager 260. Generally, output manager 260 may be used by web service environment 200 to record the results of verifier 240. More specifically, output manager may be any combination of software, hardware, and/or controlling logic that allows web service environment 200 to handle the results of the comparison by verifier 240. In certain embodiments, output manager 260 may be computer logic stored in memory 216. Output manager 260 is capable of taking the result of the comparison of the response file 230 to expected data 250 and storing it for future use. For example, output manager 260 may store the result of comparisons done by verifier 240 in memory 216. An employee of the enterprise implementing web service 220 may review those results stored by output manager 260 to determine whether web service 220 is functioning correctly.

The operation of web service environment 200 will now be discussed. The testing of web service 220 begins by communicating request file 210 to web service 220. In certain embodiments, request file 210 may be communicated to web service 220 via message 202. Message 202 may include request file 210, a location of request file 210, a database SQL query, or any other information suitable for providing web service 220 input data. Web service 220 may then execute computer logic that may be stored in memory 216 to process information contained in request file 210. For example, web service 220 may be instructed by request file 210 to update sample data stored in a database. As another example, web service 220 may be instructed by request file 210 to create sample user accounts. As a further example, web service 220 may be a module for completing credit card transactions. In such an example, request file 210 may be sample credit card transactions. Web service 220 may then process those sample credit card transactions and output the results to response file 230. In certain embodiments, web service 220 may process the information contained in request file 210 and then communicate the output data to response file 230 via message 204. Message 204 may include the contents of response file 230.

Verifier 240 may then begin to verify response file 230. More specifically, verifier 240 may communicate message 206 requesting access to response file 230. In response to message 206, verifier 240 may gain access to response file 230. Verifier 240 may then begin to compare the information contained in response file 230 to expected data 250. In certain embodiments, verifier 240 may conduct this comparison by accessing data mapping file 270. In certain embodiments, verifier 240 may communicate message 218. Message 218 may comprise a request to access data mapping file 270. In response to message 218, verifier 240 may gain access to data mapping file 270. After having access to data mapping file 270, verifier 240 will be able to compare information contained in response file 230 to expected data 250. For example, response file 230 may be information contained in an extensible mark-up language file and expected data 250 may be data in a database. In such an example, verifier 240 may communicate message 208 to expected data 250. Message 208 may comprise a database SQL query requesting certain data from expected data 250. Verifier 240 may then use data mapping file 270 to determine which portions of response file 230 correspond to portions of expected data 250. After determining which portions of response file 230 correspond to expected data 250, verifier 240 may then compare the data. Verifier 240 may determine whether the data in response file 230 successfully matches expected data 250. Verifier 240 may then record the result of its verification. In particular, verifier 240 may communicate message 212 to output manager 260. Message 212 may comprise the results of the comparison between data in response file 230 and data in expected data 250 conducted by verifier 240. Output manager 260 may then store the result of verifier 240's comparison in memory 216.

Any component of web service environment 200 may include an interface, logic, memory, and other suitable elements. An interface receives input, sends output, processes the input and/or output and/or performs other suitable operations. An interface may comprise hardware and/or software. Logic performs the operation of the component. For example, logic executes instructions to generate output from input. Logic may include hardware, software, and/or other logic. Logic may be encoded in one or more non-transitory media, such as a computer-readable medium or any other suitable tangible medium, and may perform operations when executed by a computer. Certain logic, such as a processor, may manage the operation of a component. Examples of a processor include one or more computers, one or more microprocessors, one or more applications, and/or other logic. Any suitable logic may perform the functions of web service environment 200.

Particular embodiments of the present disclosure may provide some, none, or all of the following technical advantages. For example, certain embodiments can provide the ability for employees of an enterprise to create test case files and test various applications without possessing any programming knowledge. In such embodiments, the employees may be able to thoroughly test and verify the operation of applications without having to implement the details of a test case file. As another example, certain embodiments increase efficiency for an enterprise. In such embodiments, the time-consuming process of developing test case files and the underlying programming code is reduced greatly due to the reusable and modular nature of the embodiments. Furthermore, certain embodiments increase efficiency for an enterprise by automating the test case file generation and implementation process, accomplishing tasks that would difficult for an employee of the enterprise to complete in a timely manner.

Figure 3A:
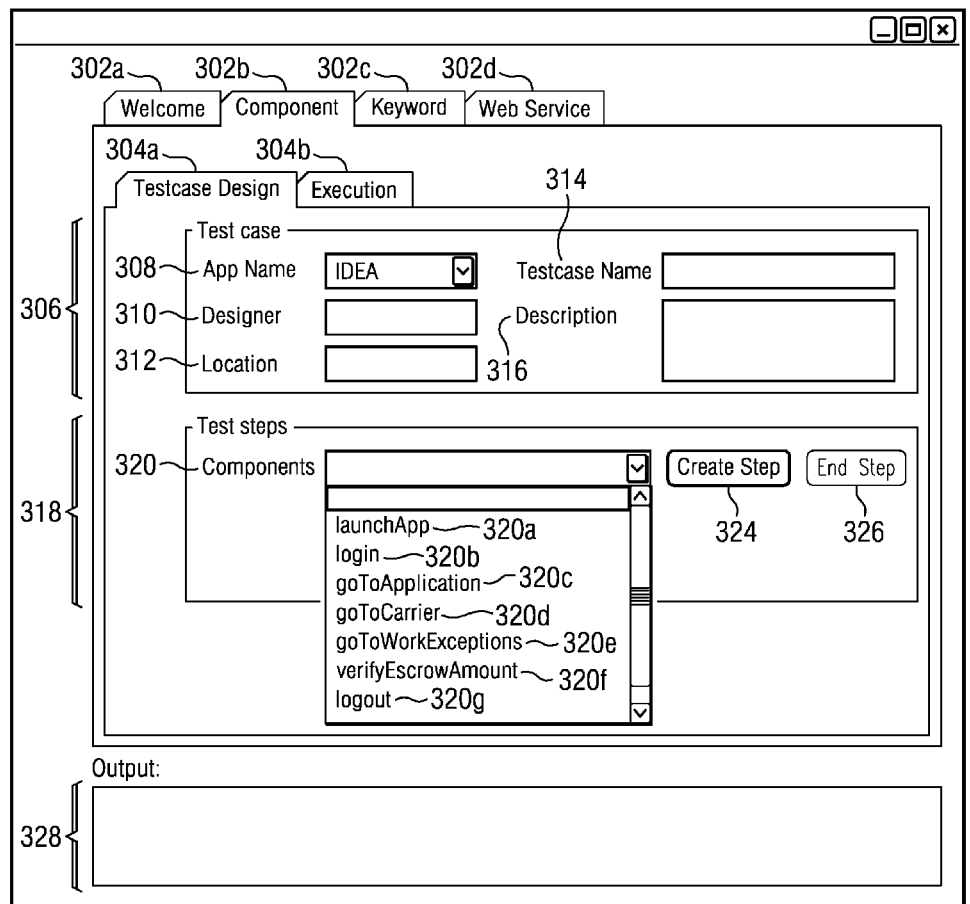
FIG. 3A illustrates an example interface for building a test case file using components.

FIG. 3A illustrates an example interface for building a test case file using components. For example, interface 300 may be implemented in GUI 116 of workstation 110. The user can use interface 300 to build a test case file 150 using components 152. Interface 300 may include many graphical elements that will allow a user to create test case file 150. For example, interface 300 may include test case tabs 302, function tabs 304, test case information 306, test case steps information 318, and output box 328. Using test case tabs 302 a user can navigate to different portions of interface 300 that provide the user with various functionality. In the illustrated example, tab 302b is selected signifying the user is building test case 150 using components 152. Function tabs 304 allow a user to navigate to various portions of interface 300 that provide various functionality for interacting with test case files 150 built using components 152. For example, interface 300 includes function tab 304a for building test case file 150 using components 152 and function tab 304b which allows a user to implement a test case file 150 built using components 152. In the illustrated example, function tab 304a is selected allowing a user to create a test case file 150 using components 152. Underneath function tabs 304 is test case information 306. Test case information provides a variety of information related to a particular test case file 150 that a user is trying to create. For example, test case information 306 may include application name 308, designer 310, test case location 312, test case name 314, and description 316. Application name 308 allows the user to associate the current test case file 150 being designed with a particular application under test 180. In the illustrated embodiment, application name 308 is a dropdown list of a variety of applications under test 180. The field labeled designer 310 is a field that allows a user to list a particular user who is responsible for designing the current test case file 150. In the illustrated embodiment, designer 310 is a text box that receives user text input. Test case information 306 may also include test case location 312. Test case location 312 allows a user to specify where to store the current test case file 150. In the illustrated example, location 312 is a text entry box that is capable of receiving user text input. In certain embodiments, location 312 may be a graphical element that allows a user to navigate through a file system of a particular computer allowing the user to specify a particular location on that computer to store test case file 150. The user may also choose to label the current test case file 150. Test case name 314 allows the user to specify a particular label for the current test case file 150. In the illustrated example, test case name 314 is a text entry box that is capable of receiving user text input. Additionally, a user may wish to store a description related to current test case file 150. Description 316 may be used by a user to associate a short description with current test case file 150. In the illustrated example, description 316 is a text entry box capable of receiving typed user input.

A user may use interface 300 to add one or more test case steps to test case file 150. In certain embodiments, a user may be able to accomplish this using test case steps information 318 of interface 300. Test case step information 318 may include information such as components 320, step creation button 324, and end step button 326. In certain embodiments, components 320 may be a dropdown menu corresponding to components 152. According to some embodiments, instruction 154 may be associated with component 320. To create a step, a user may first press the create step button 324. In the illustrated example, pressing create step button 324 may allow the user to choose a particular component 320. Certain components 320 may be associated with certain input parameters 178. In such a scenario, test case steps information 318 may display a parameter input box capable of receiving typed user input. A user may end a particular test case step by pressing end step button 326. Pressing end step button 326 may associate component 320, input parameter 178, and any user input 176, if applicable, to the current test case step being created for test case file 150. The user may continue to create another test case step by pressing create step button 324 or the user may be finished creating test case file 150. In such an instance, the information entered into interface 300 is then associated with test case file 150. In the illustrated example, test case file 150 is stored at the location defined in location 312.

Figure 3B:
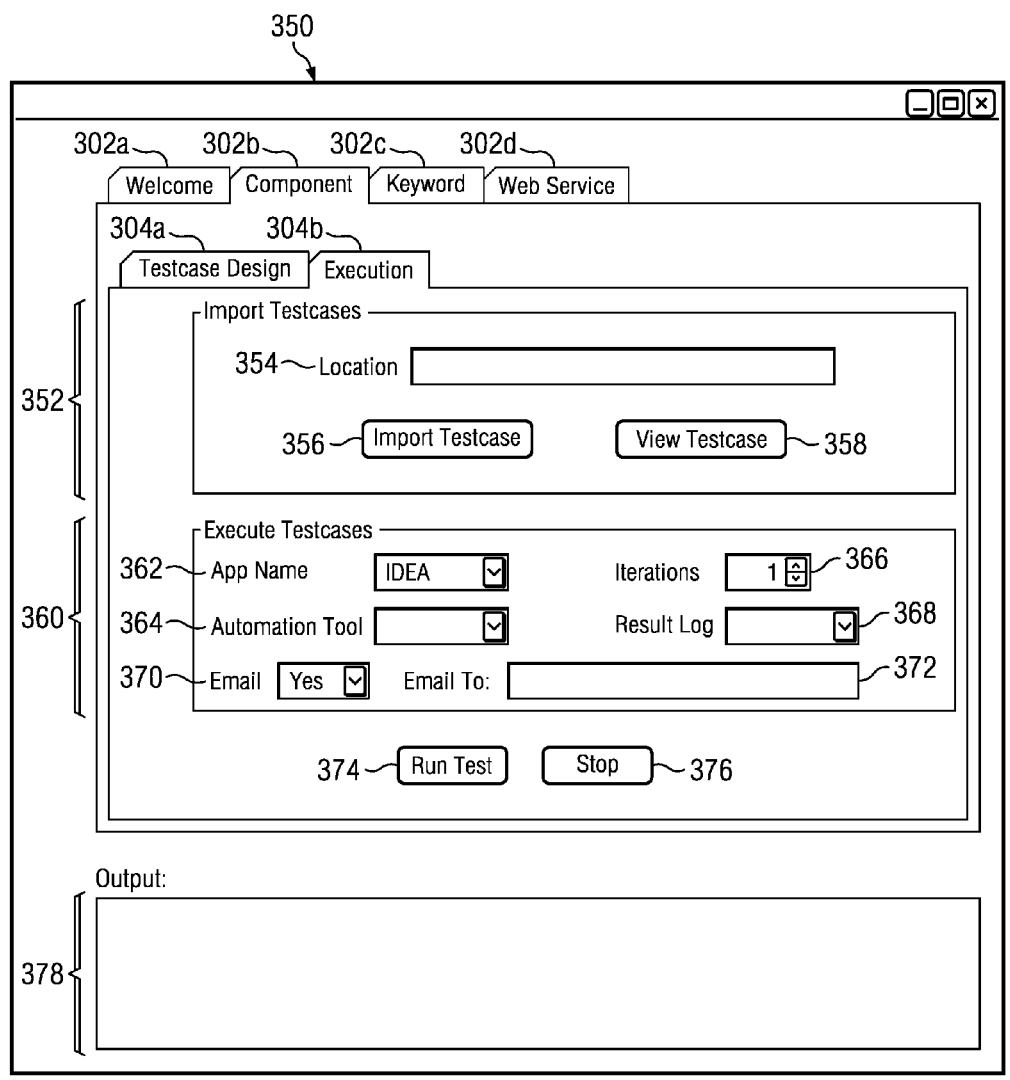
FIG. 3B illustrates an example interface for executing a test case file created by using components.

FIG. 3B illustrates an example interface for executing a test case file created by using components. For example, interface 350 may be used to execute test case files 150 that were created using interface 300 of FIG. 3A. Interface 350 may be embodied in GUI 116 of workstation 110. Interface 350 may be included in an interface that also includes interface 300. Interface 350 includes test case tabs 302, function tabs 304, test case information 352, and test case execution information 360. Test case tabs 302 and function tabs 304 may be the same as test case tabs 302 and function tabs 304 included in interface 300 of FIG. 3A. In the illustrated example, tab 304b is selected signifying a user is in the execution mode of the test case file creation and implementation tool. Interface 350 may include test case import information 352. Test case import information 352 may allow the user to select a particular test case file 150 to implement. In the illustrated embodiment, test case import information 352 includes test case location 354, import button 356, and view test case button 358. Test case location 354 may allow a user to specify a particular location of test case file 150. For example, test case location 354 may be a text entry box that allows a user to type in text specifying the location of test case file 150. In certain embodiments, test case location 350 may be any graphical element that gives the user access to the file system of a particular system. The user may be able to then browse the file system of a particular system to specify the location of test case file 150. Test case import information 352 may also include import button 356. Import button 356 signals to interface 350 that the user has chosen a particular test case file 150 to implement. View test case button 358 may allow a user to view the contents of a particular test case file 150. In certain embodiments, the contents of particular test case file 150 may be displayed in output box 378 of interface 350.

Next, there is test case execution information 360. Test case execution information 360 allows a user to specify a variety of details regarding the implementation of a particular test case 150. Test case execution information 360 may include application under test name 362. Application under test name 362 may allow a user to specify a different application under test 180 than what is associated with the particular test case file 150. In the illustrated example, application under test name 362 is a dropdown menu displaying a variety of applications under test 180 allowing the user to select a particular application under test 180. Interface 350 may also allow a user to choose a different automation tools provider 142 than the automation tools provider 142 associated with the particular test case file 150. For example, test case execution information 360 may include automation tools selector 364. Automation tools selector 364 provides the functionality for a user to select a particular automation tools provider 142. In the illustrated example, automation tools selector 364 is a dropdown menu that allows a user to pick a particular automation tools provider 142.

A user may also want to specify the number of iterations a particular test case file 150 should be run. A user may be able to specify iterations by using the element labeled iterations 366 of test case execution information 360. A user may use iterations 366 to specify a number of times that test case file 150 should be implemented. In the illustrated example, iterations 366 is a text box displaying integers that may be added to or subtracted. Additionally, a user may want to specify a particular location for storing the results. Thus, test case execution information 360 also includes results log location 368. Results log location 368 allows a user to specify a particular location where results from the implementation of test case file 150 should be stored. Furthermore, a user may want certain results emailed to a particular person. To specify email information a user may use email option 370 and email address 372 included in test case execution information 360. Email option 370 may be a flag that a user can select to specify that the user wants results of the implementation of test case file 150 emailed. A user may then specify a particular email address in email address 372. In the illustrated example, email option 370 presents the options of "yes" for receiving emails and "no" for not receiving emails. Email address 372 is represented by a text entry box which is capable of receiving user typed input.

Once a user has chosen all of the relevant information regarding a particular test case file 150, a user may wish to implement a particular test case file 150. Interface 350 may include run test case button 374. Run test case button 374 may implement the selected test case file 150 in accordance with the various parameters specified by the user using interface 350. Results of implementing test case file 150 may also be displayed in output box 378. In the illustrated example, output box 378 is a text box capable of displaying text to a user. If a user wishes to stop implementing a test case file 150, the user may press stop test case button 376. Pressing stop test case button 376 will cease the execution of a particular test case file 150.

Figure 4A:
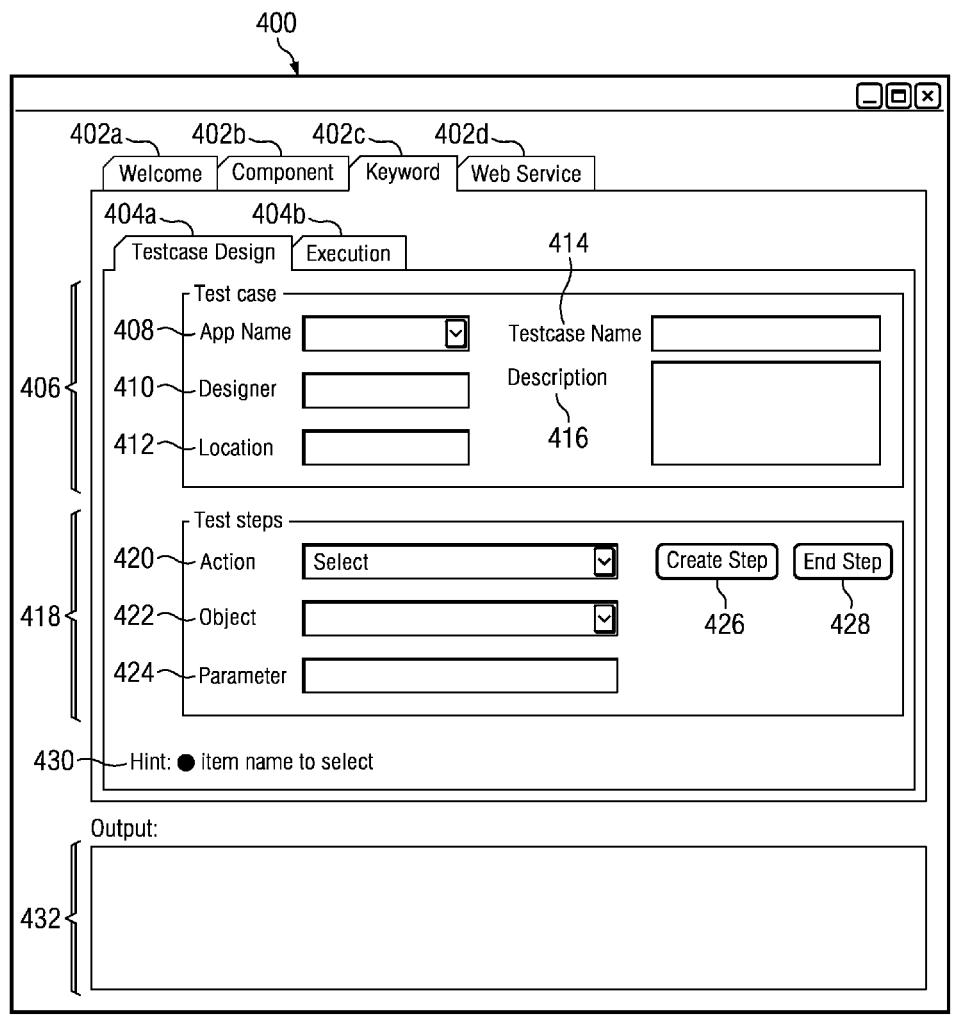
FIG. 4A illustrates an example interface for building a test case file using action keywords.

FIG. 4A illustrates an example interface for building a test case file using action keywords. In certain embodiments, interface 400, interface 300, and interface 350 may be included in the same test case management tool. Interface 400 may be implemented in GUI 116 of workstation 110 providing a variety of functionality available in the example system of FIG. 1.

Interface 400 may include test case tabs 402, function tabs 404, test case information 406, and test case steps information 418. Test case tabs 402 may allow a user to navigate to certain portions of interface 400. In certain embodiments, test case tabs 402 may be the same as test case tabs 302 of FIG. 3A. In the illustrated embodiment, test case tab 402c is selected signifying a user is in the action keyword implemented test case file portion of the testing tool. Interface 400 may also include function tabs 404. Function tabs 404 may allow a user to select to either create test case file 150 or implement test case file 150. In the illustrated example, a user wishing to create a test case file 150 using action keywords 158 may select function tab 404a. A user wishing to execute a test case file 150 which was implemented using action keywords 158 may click function tab 404b. In the illustrated example, function tab 404a is selected signifying a user is in the creation mode.

Next, there is test case information 406. Test case information 406 provides a variety of information regarding test case file 150 to a user. For example, test case information 406 may include application name 408, designer 410, test case location 412, test case name 414, and description 416. Application name 408 allows the user to associate the current test case file 150 being designed with a particular application under test 180. In the illustrated embodiment, application name 408 is a dropdown list of a variety of applications under test 180. The field labeled designer 410 is a field that allows a user to list a particular user who is responsible for designing the current test case file 150. In the illustrated embodiment, designer 410 is a text box that receives user typed input. Test case information 406 may also include test case location 412. Test case location 412 allows a user to specify where to store the current test case file 150 being worked upon. In the illustrated example, location 412 is a text entry box that is capable of receiving user text input. In certain embodiments, location 412 may be a graphical element that allows a user to navigate through a file system of a particular computer allowing the user to specify a particular location on that computer to store test case file 150. The user may also choose to label the current test case file 150. Test case name 414 allows the user to specify a particular label for the current test case file 150. In the illustrated example, test case name 414 is a text entry box that is capable of receiving typed user input. Additionally, a user may wish to store a description related to current test case file 150. Description 416 may be used by a user to associate a short description with current test case file 150. In the illustrated example, description 416 is a text entry box capable of receiving typed user input.

Next, interface 400 may include test case steps information 418. A user may use test case steps information 418 to build particular steps using action keywords 420. In particular, test case steps information 418 may include action keywords 420, which allow the user to select a particular action keyword 158. Action keywords 420 may be any graphical element that will allow a user to select a particular action keyword 158. In the illustrated example, action keyword 420 is a dropdown menu which a user can use to select a particular action keyword 158. For certain action keywords 158 selected by a user, there may be an associated object 184. In such an instance, when action keyword 158 is associated with an object 184, interface 400 may include object 422. Object 422 may be a list of objects that can be associated with a particular action keyword 158. In the illustrated example, object 422 may be a dropdown menu that allows a user to select a particular object 184 to associate with action keyword 158. In certain embodiments, action keyword 158 may require input parameter 178. In such embodiments, if a user has selected action keyword 158 which requires input parameter 178, test case steps information 418 may include parameter input 424. Parameter input 424 will allow a user to enter text to associate input parameter 178 and user input 176 with the selected action keyword 158. In the illustrated example, parameter input 424 is a text box capable of receiving typed user input. For certain action keywords 158, objects 184, and/or input parameters 178, there may be an associated hint 182. In such an instance, if a user is interacting with a particular element that is associated with hint 182 then interface 400 may display hint 182 in graphical element hint 430. In the illustrated example, hint 430 is displaying a hint 182 instructing the user to select a particular item name.

To create a step, a user may first press the create step button 426. In the illustrated example, pressing create step button 426 may allow user to choose a particular action keyword 420. A user may end a particular test case step by pressing end step button 428. Pressing end step button 428 may associated action keyword 420 to any object 422, parameter input 424, or user input 176 if applicable to the current test case step being created for test case file 150. The user may continue to create another test case step by pressing create step button 426 or the user may be finished creating test case file 150. Once the user is finished creating test case file 150, the information entered into interface 400 is associated with test case file 150. In the illustrated example, test case file 150 is then stored at the location defined in location 412. Additionally, interface 400 may also include output 432. Output 432 may be any graphical element capable of displaying messages from interface 400 to a user. In the illustrated example, output 432 is a text box that displays text providing the user with a variety of information regarding the creation of test case file 150.

Figure 4B:
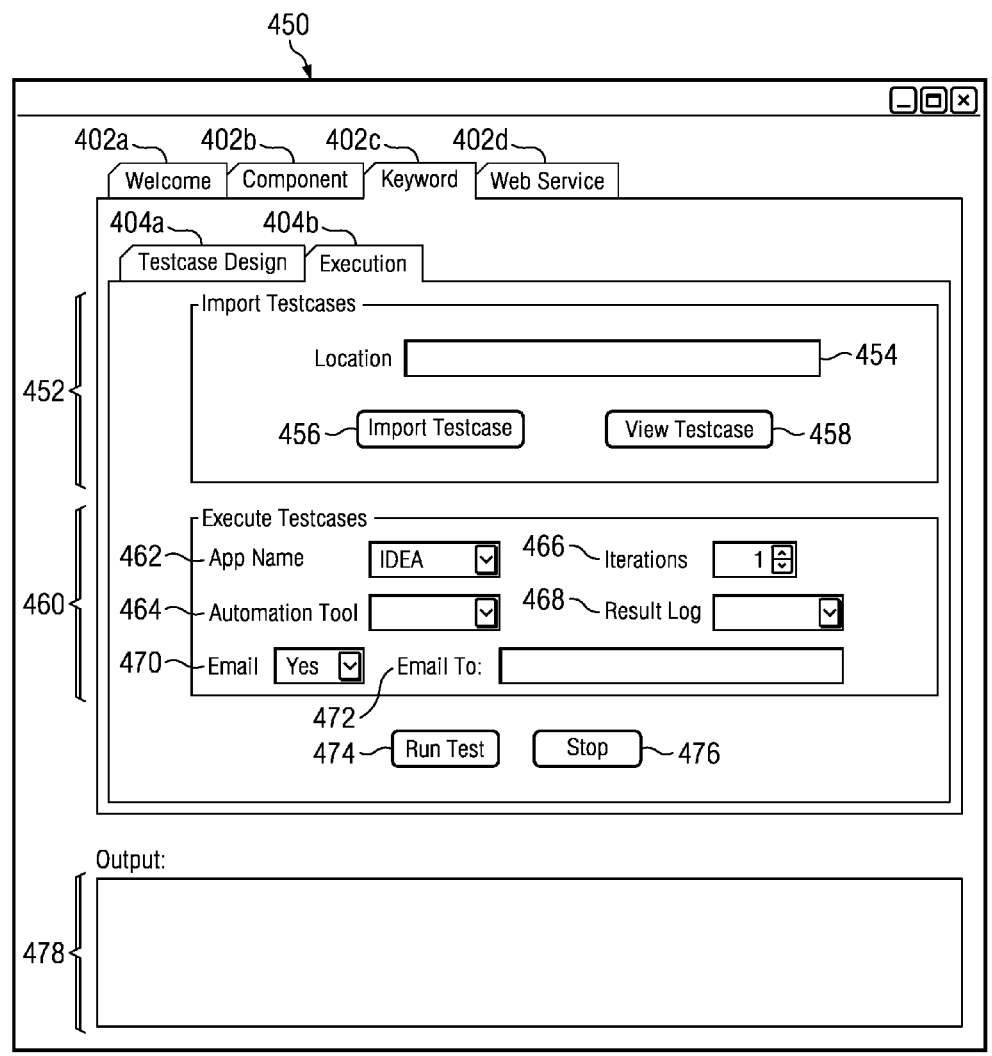
FIG. 4B illustrates an example interface for executing a test case file created by using action keywords.

FIG. 4B illustrates an example interface for executing a test case file created by using action keywords. For example, interface 450 may be used to execute test case files 150 that were created using interface 400 of FIG. 4A. Interface 450 may be embodied in GUI 116 of workstation 110. Interface 450 may be included in a tool that also includes interface 400. Interface 450 includes test case tabs 402, function tabs 404, test case information 452, and test case execution information 460. Test case tabs 402 and function tabs 404 may be the same as test case tabs 402 and function tabs 404 included in interface 400 of FIG. 4A. In the illustrated example, tab 404*b* is selected signifying a user is in the execution mode of the test case file creation and implementation tool. Interface 450 may include test case import information 452. Test case import information 452 may allow the user to select a particular test case file 150 to implement. In the illustrated embodiment, test case import information 452 includes test case location 454, import button 456, and view test case button 458. Test case location 454 may allow a user to specify a particular location of test case file 150. For example, test case location 454 may be a text entry box that allows a user to type in text specifying the location of test case file 150. In certain embodiments, test case location 450 may be any graphical element that gives the user access to the file system of a particular system. The user may be able to then browse the file system of a particular system to specify the location of test case file 150. Test case import information 452 may also include import button 456. Import button 456 signals to interface 450 that the user has chosen a particular test case file 150 to implement. View test case button 458 may allow a user to view the contents of a particular test case file 150. In certain embodiments, the contents of particular test case file 150 may be displayed in output box 478 of interface 450.

Next, there is test case execution information 460. Test case execution information 460 allows user to specify a variety of details regarding the implementation of a particular test case 150. Test case execution information 460 may include application under test name 462. Application under test name 462 may allow user to specify a different application under test 180 than is associated with the particular test case file 150. In the illustrated example, application under test name 462 is a dropdown menu displaying a variety of applications under test 180 allowing the user to select a particular application under test 180. Interface 450 may also allow a user to choose a different automation tools provider 142 than the automation tools provider 142 associated with the particular test case file 150. For example, test case execution information 460 may include automation tools selector 464. Automation tools selector 464 provides the functionality for user to select a particular automation tools provider 142. In the illustrated example, automation tool selector 464 is a dropdown menu that allows a user to pick a particular automation tools provider 142. A user may also want to specify the number of iterations a particular test case file 150 should be run. A user may be able to specify iterations by using the element labeled iterations 466 of test case execution information 460. A user may use iterations 466 to specify a number of times that test case file 150 should be implemented. In the illustrated example, iterations 466 is a text box displaying integers that may be added to or subtracted. Additionally, a user may want to specify a particular location for storing the results. Thus, test case execution information 460 also includes results log location 468. Results log location 468 allows a user to specify a particular location where results from the implementation of test case file 150 should be stored. Furthermore, a user may want certain results emailed to a particular person. To specify email information, a user may use email option 470 and email address 472 included in test case execution information 460. Email option 470 may be a flag that a user can select to specify that the user wants results of the implementation of test case file 150 emailed. A user may then specify a particular email address in email address 472. In the illustrated example, email option 470 presents the options of yes for receiving emails and no for not receiving emails. Email address 472 is represented by a text entry box which is capable of receiving user typed input.

Once a user has chosen all of the relevant information regarding a particular test case file 150, a user may wish to implement a particular test case file 150. Interface 450 may include a run test case button 474. Run test case button 474 may implement the selected test case file 150 in accordance with the various parameters specified by the user using interface 450. Results of implementing test case file 150 may also be displayed in output box 478. In the illustrated example, output box 478 is a text box capable of displaying text to a user. If a user wishes to stop implementing a test case file 150, user may press stop test case button 476. Pressing stop test case button 476 will cease the execution of a particular test case file 150.

Figure 5:
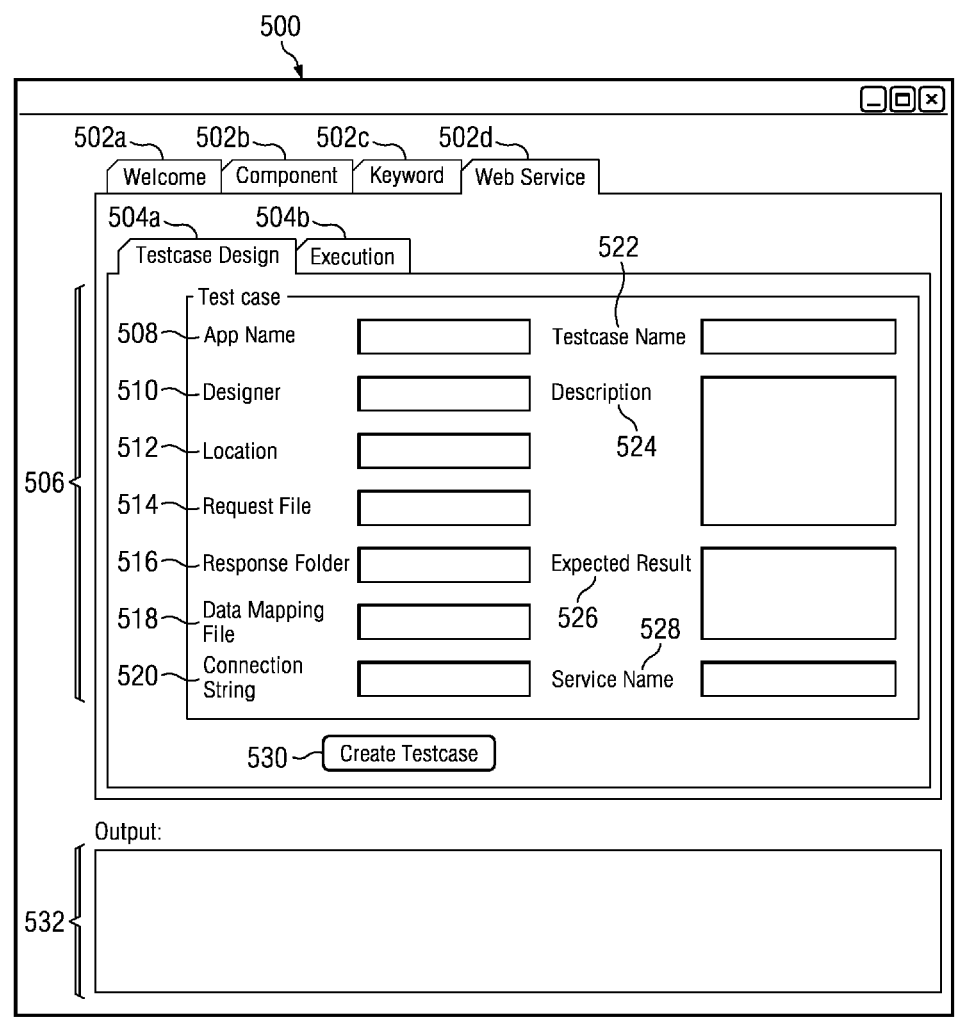
FIG. 5 illustrates an example interface for creating a web service test case.

FIG. 5 illustrates an example interface for creating a web service test case. When a user desires to design a test case for testing a web service, a user may use example interface 500. In certain embodiments, example interface 500 may be part of a graphical user interface on a workstation accessible to the user. More specifically, example interface 500 may comprise test case tabs 502, function tabs 504, and test case information 506. Test case tabs 502 may be any tabs that allow user to navigate the interface that will give access to the user to various functionality of example interface 500. For example, test case tab 502*a* may be a welcome screen briefly explaining how to use example interface 500. Test case tab 502*b* may give the user access to the functionality of building test case files by using components. Test case tab 502*c* may be a tab that gives the user access to the functionality that allows the user to build a test case file by using action keywords. Test case tab 502*d* may give the user access to the functionality of building test case files for a web service. In the illustrated example, test case tab 502*d* is selected, signifying the user has navigated to the web service test case portion of example interface 500. Example interface 500 may also have function tabs 504 that allow the user to navigate to portions that provide the user with various functionality regarding web service test cases. For example, example interface 500 may have function tabs 504*a* which gives access to the user to portions of interface 500 allowing the user to create a web service test case. Function tab 504*b* may give the user access to a portion of interface 500 that allows the user to implement a particular web service test case. In the illustrated example, function tab 504*a* is selected indicating that a user is in the test case design phase of interface 500.

Interface 500 may also include test case information 506. Test case information 506 is any information that a user may input regarding a particular web service test case. In particular, test case information 506 may include application name 508. Application name 508 may be any information regarding the particular web service 220 that a user desires to test. In the illustrated example, application name 508 is a text entry box that is capable of receiving user input regarding the name of web service 220. Test case information 506 may also include designer 510. Designer 510 is any information regarding the creator of a particular web services test case. In the illustrated embodiment, designer 510 is a text box capable of receiving text input from a user defining the creator of the web services test case file.

Next, test case information 506 may also include test case location 512. Test case location 512 may be any location that is capable of storing the current test case file. For example, test case file location 512 may be any location in a file system, database, network, or any other suitable file location signifying the intended location of the current web services test case file. Next is request file location 514. Request file location 514 may be any location in a file system, database, network, or any other suitable file location signifying the location of a particular request file 210. In the illustrated example, request file location 514 is a text box capable of receiving user input signifying where a particular request file 210 is located. Test case information 506 may also include a response folder 516. Response folder 516 is any location capable of storing a particular response file 230 produced by web service 220. In the illustrated example, response folder 516 is a text box capable of receiving user input specifying a particular folder to save response file 230 as generated by web service 220.

Test case information 506 may also include data mapping file location 518. Data mapping file location 518 may be the location of a particular data mapping file 270 that is applicable to the web service test case currently being designed. In the illustrated embodiment, data mapping file location 518 is a text box capable of receiving user entry specifying a specific location of a particular data mapping file 270. Additionally, test case information 506 may also include database connection string 520. Database connection string 520 is any information that allows web service 220 to gain access to a particular database. For example, web service 220 may need to access a particular database to execute various functionality. Web service 220 may use database connection string 520 to connect to the particular database. In the illustrated example, database connection string 520 is a text entry box capable of receiving user input specifying a particular database connection string allowing web service 220 to establish a connection with a particular database.

Test case information 506 may also include some information describing the web service test case currently being designed. For example, test case information 506 may include test case name 522. Test case name 522 may be any label given by a user to this particular web service test case. In the illustrated example, test case name 522 is a text entry box capable of receiving text entry from a user. Additionally, test case information 506 may include test case description 524. Test case 524 may be some text briefly describing the purpose of the test case currently being designed. In the illustrated example, test case description 524 is a text entry box capable of receiving text input from a user. Test case information 506 may also include expected result 526. Expected result 526 may be any text that generally summarizes what a user may be expecting after the execution of the web service test file currently being designed. Additionally, test case information 506 may also include service name 528. Service name 528 may be text displayed providing information for the particular web service 220 being tested. For example, service name 528 may be information that indicates to the user with which web service 220 this particular test case file is associated.

Interface 500 may also include output 534. Output 534 allows interface 500 to provide information to a user. For example, if there is an error associated with the creation of the web service test case being designed, interface 500 may display that error in output 534. After the user is finished with creating a web service test case file, the user may click test case creation button 530. Test case creation button 530 allows the user to save to memory the current web service test case being designed.

FIG. 6 illustrates example component test case data which may be used by application test system 100 of FIG. 1. The example dataset of FIG. 6 is component test case data 600. Component test case data 600 may be data included in a particular test case file 150 created by using components. Component test case data 600 is information that may be used by functional environment 130 to provide various functionality of application test system 100. In certain embodiments, component test case data 600 may be stored as part of test case files 150. It should be understood that component test case data 600 is provided for illustrative purposes only. Component test case data 600 can be stored in a text file, a table in a relational database, a spreadsheet, a hash table, a linked list, or any other suitable data structure capable of storing information. Moreover, the data relationships depicted are for illustrative purposes only. For example, a particular ratio between data elements may be illustrated for example purposes only. Application test system 100 is capable of handling data in any suitable format, volume, structure, and/or relationship as appropriate. Component test case data 600 may contain test case name 602, test case description 604, test case step name 606, test case step instruction 608, expected result 610, and/or any other suitable information. In the illustrated example, records 612 are example entries of component test case data 600 where each record 612 corresponds to a particular test case step.

In certain embodiments, test case name 602 is a label that provides the user with information regarding the test case being implemented. Test case name 602 may be any alphanumeric string capable of identifying a test case to a user. In the current example, records 612 all include a text string of "UI 1" signifying that each record 612 is associated with component test case name 602 of "UI 1." Test case description 604 may provide a brief description of the purpose of particular test case file 150. Test case description 604 may be any text string capable of providing information to the user regarding the functionality of a particular test case file 150. For example, each record includes test case description 604 of "verify UI." Component test case data 600 may also include test case step name 606. Test case step name 606 may be any text string capable of identifying a particular test case step of test case file 150. For example, record 612a has a corresponding step name 606 labeled "Step 1." Record 612b has a corresponding step name 606 labeled "Step 2."

Component test case data 600 may include test case step instructions 608. Test case step instructions 608 is any information that can be utilized by functional environment 130, provider environment 170, or any other component of application test system 100 for implementing a particular test case step of test case file 150. In certain embodiments, test case step instructions 608 may comprise component 152, instructions 154, computer logic 156, input parameters 178, sample data 148, user input 176, or any other information suitable for a particular purpose. In the illustrated embodiment, record 612a comprises test case step instruction 608 corresponding to instruction 154 of "launchApp" and user input 176 for input parameters 178 of "http://location:8000/mod/defaut.aspx" and "application launched." Thus, record 612a illustrates a test case step instruction 608 which includes an instruction 154 of "launchApp" that requires two input parameters 178. Record 612b includes test case step instruction 608 of instruction 154 of "login." Instruction 154 of "login" is associated with three input parameters 178. The text entries of "login," "password," and "application launched" correspond to user inputs 176 associated with input parameters 178. Record 612c includes test case step instruction 608 of "verifyLoanData" which may correspond to a particular instruction 154 which is not associated with any input parameters 178. Record 612d includes test case step instruction 608 of "logout" corresponding to instruction 154 which may have associated with it input parameter 178. "Logged out" may be the user input 176 associated with input parameter 178. Record 612e may include test case step instruction 608 for instruction 154 of "closeApp." Instruction 154 of "closeApp" may be associated with input parameter 178. "Application closed" may be user input 176 associated with input parameter 178.

Component test case data 600 may also include expected result 610. Expected result 610 may be any information regarding the description of what an expected result of a particular test case step should be. For example, record 612a includes expected result 610 of "application launched." "Application launched" may signify that the expected result after the execution of test case step name 606 of "Step 1" is that a particular application may be launched. Similarly, record 612b includes expected result 610 of "application launched." Expected result 610 of "application launched" signifies that the expected result of executing test case step name 606 of "Step 2" is that a particular application is launched. Record 612d may include expected result 610 of "Logged out." Expected result 610 of "Logged out" may imply that the expected result of test case step name 606 of "Step 4" is that a particular user may be logged out of application under test 180. Finally, record 612e may include expected result 610 of "application closed." This may signify that test case step name 606 of "Step 5" may result in a particular application under test 180 to be closed after the execution of test case step name 606 "Step 5."

FIG. 7 illustrates example action keyword test case data which may be used by application test system 100 of FIG. 1. The example dataset of FIG. 7 is action keyword test case data 700. Action keyword test case data 700 may be data included in a particular test case file 150 created by using action keywords 158. Action keyword test case data 700 is information that may be used by functional environment 130 to provide various functionality of application test system 100. In certain embodiments, action keyword test case data 700 may be stored as part of test case files 150. It should be understood that action keyword test case data 700 is provided for illustrative purposes only. Action keyword test case data 700 can be stored in a text file, a table in a relational database, a spreadsheet, a hash table, a linked list, or any other suitable data structure capable of storing information. Moreover, the data relationships depicted are for illustrative purposes only. For example, a particular ratio between data elements may be illustrated for example purposes only. Application test system 100 is capable of handling data in any suitable format, volume, structure, and/or relationship as appropriate. Action keyword test case data 700 may contain test case name 702, test case description 704, test case step name 706, and test case step instruction 708, and/or any other suitable information. In the illustrated example, records 710 are example entries of action keyword test case data 700 where each record 710 corresponds to a particular test case step.

In certain embodiments, test case name 702 is a label that provides the user with information regarding the test case being implemented. Test case name 702 may be any alphanumeric string capable of identifying a test case to a user. In the current example, records 710 all include a text string of "UI 1" signifying that each record 710 is associated with action keyword test case name 702 of "UI 1." Test case description 704 may provide a brief description of the purpose of particular test case file 150. Test case description 704 may be any text string capable of providing information to the user regarding the functionality of a particular test case file 150. For example, each record includes test case description 704 of "verify UI." Action keyword test case data 700 may also include test case step name 706. Test case step name 706 may be any text string capable of identifying a particular test case step of test case file 150. For example, record 71a has a corresponding step name 706 labeled "Step 1." Record 710b has a corresponding step name 706 labeled "Step 2."

Action keyword test case data 700 may include test case step instructions 708. Test case step instructions 708 is any information that can be utilized by functional environment 130, provider environment 170, or any other component of application test system 100 for implementing a particular test case step of test case file 150. In certain embodiments, test case step instructions 708 may comprise action keyword 158, instructions 154, computer logic 156, input parameters 178, object 184, sample data 148, user input 176, or any other information suitable for a particular purpose. In the illustrated embodiment, record 710a comprises test case step instruction 708 corresponding to action keyword 158 of "OPEN_BROWSER" and user input 176 for input parameter 178 of "web address." Record 710b includes test case step instruction 708 of action keyword 158 of "CLICK." Action keyword 158 of "CLICK" is associated with object 184 of "Maps." The text entry of "Maps" may correspond to user input 176. Record 710c also includes test case step instruction 708 of "CLICK." Action keyword 158 of record 710c is associated with object 184 of "mapsSearchBox." The text entry of "mapsSearchBox" may correspond to user input 176. Record 710d includes test case step instruction 708 corresponding to action keyword 158 of "ENTER_TEXT" and user input 176 for input parameter 178 of "india." "India" may be the user input 176 associated with input parameter 178. Record 710e may include test case step instruction 708 corresponding to action keyword 158 of "PRESS_ENTER." Finally, record 710f may include test case step instruction 708 corresponding to action keyword 158 of "CLOSE_BROWSER."

FIG. 8A illustrates example action keyword data which may be used by the example system of FIG. 1. The example dataset of FIG. 8A is action keyword data 800. Action keywords data 800 may be used by functional environment 130 to provide various functionality of application test system 100. In certain embodiments, keyword actions data 800 may be stored as part of action keywords 158 in repository 160. It should be understood that action keywords data 800 is provided for example purposes only. Action keywords data 800 is depicted as having a tabular structure for illustrative purposes only. Action keywords data 800 can be stored in a text file, a table in a relational database, a spreadsheet, a hash table, a linked list, or any other suitable data structure capable of storing information. Moreover, the data relationships depicted are also for illustrative purposes only. For example, a particular ratio between data elements may be illustrated for example purposes only. Application test system 100 is capable of handling data in any suitable format, volume, structure, and/or relationship as appropriate. Action keywords data 800 may contain action keyword 802, object flag 804, parameter requirement 806, and hint 808. In the illustrated example, records 810 are example entries of action keywords data 800 where each record 810 corresponds to a particular action keyword.

In certain embodiments, action keyword 802 is an identifier that references a particular action keyword 158. Action keyword 802 may be a number, text string, or any other identifier capable of identifying a particular action keyword 158. In the current example, records 810 all include a text string as action keyword 802. For example, records 810a include action keyword 802 of "CLICK" which may reference a particular action keyword 158 corresponding to "CLICK." As another example, record 810b may include action keyword 802 of "ENTER_TEXT" which may reference an action keyword 158 corresponding to "ENTER_TEXT." Object flag 804 may represent an indication that a particular action keyword is associated with an object 184. For example, records 810a, 810d, and 810g all have object flag 804 set to "y." Object flag 804 of "y" may signify that action keyword 802 requires a particular object 184 to function properly. Particular records 810, such as records 810b, 810c, 810e are depicted as having object flag 804 set to nothing. The absence of an object flag 804 for these particular records may suggest that there is no object 184 required for action keyword 802. Action keywords data 800 may also include parameter requirement 806. Parameter requirement 806 may be any indication that a particular action keyword 802 may require an input parameter 178. For example, record 810b includes parameter requirement 806 of "y." Parameter requirement 806 of "y" may signify that a particular action keyword 802 is associated with input parameter 178. Thus, any action keyword 802 that has parameter requirement 806 of "y," user input 176 may be required for action keyword 802. Parameter requirement 806 may also indicate that there is no input parameter 178 associated with a particular action keyword 802. This may be done by either an affirmative piece of information contained within parameter requirement 806 or it may be indicated by the lack of information contained within parameter requirement 806. For example, record 810a contains nothing for parameter requirement 806. This may be interpreted as action keyword 802 of record 810a not having an associated input parameter 178. Furthermore, action keyword data 800 may also contain hint 808. Hint 808 may be any text providing useful information to a user that may be creating a particular test case file 150 using action keywords 158. For example, hint 808 may be a sentence explaining to a potential user what object 184 or user input 176 may be needed for action keyword 802. For example, in record 810e hint 808 is a hint for the type of user input 176 and input parameter 178 may require for action keyword 158. In the illustrated example, hint 808 of record 810e is "Wait time." This may indicate to a user that there is input parameter 178 associated with action keyword 158 which requires user input 176. Hint 808 thus indicates to a user that user input 176 may be a "Wait time." Conversely, record 810a has no entry for hint 808. This may signify that there is no hint to be displayed for action keyword 802.

FIG. 8B illustrates example object data which may be used by the example system of FIG. 1. Example dataset of FIG. 8B is object data 850 which may be used by functional environment 130, provider environment 170, or any other component of application test system 100 to provide various functionality of application test system 100. In certain embodiments, object data 850 may be stored as part of objects 184 in repository 160. It should be understood that object data 850 is provided for example purposes only. Object data 850 is depicted as having a tabular structure for illustrative purposes only. Object data 850 can be stored in a text file, a table in a relational database, a spreadsheet, a hash table, a linked list or any other suitable data structure capable of storing information. Moreover, the data relationships depicted are also for illustrative purposes only. For example, a particular ratio between data elements may be illustrated for example purposes only. Application test system 100 is capable of handling data in any suitable format, volume, structure, and/or relationship as appropriate. Object data 850 may contain object name 852, object location 854, object sub-location 856, and object type 858. In the illustrated example, records 860 are example entries of object data 850 where each record 860 corresponds to a particular object 184.

In certain embodiments, object name 852 is an identifier that references a particular object 184. Object name 852 may be a number, a text string, or any other identifier capable of identifying a particular object 184. In the current example, records 860 all include a text string as object name 852. For example, records 860a contains object name 852 of "newsSearchBox." Object name 852 of "newsSearchBox" may correspond to a particular object 184 with the name of "newsSearchBox." As another example, record 860b may include object name 852 of "search News." Object name 852 of "search News" may correspond to an object 184 with the name of "search News." In certain embodiments, objects data 850 may also include object location 854. Object 854 may signify a particular portion of application under test 180 where a particular object 184 may be located. Object location may be a number, character string, or any other identifier capable of identifying a particular location that may contain particular object 184. For example, record 860a may contain object location 854 of "Browser." This signifies that an object 184 with object name 852 of "newsSearchBox" may be located in a portion of application under test 180 labeled with object location 854 of "Browser." It should be noted that although all records 860 and objects data 850 are depicted as having object location 854 of "Browser." Object data 850 may contain a variety of different object locations 854. Additionally, object data 850 may also include object sub-location 856. Object sub-location 856 may be a particular location within object location 854 where a particular object 184 may be found in application under test 180. For example, in record 860a object 184 with objects name 852 of "newsSearchBox" may be found at object sub-location 856 of "News Page" of object location 854 of "Browser." Similarly, record 860c signifies an object 184 corresponding to object name 852 of "mapsSearchBox" may be located in object sub-location 856 of "Maps Page" of object location 854 of "Browser." In certain embodiments, object data 850 may also include object type 858. Object type 858 may be any information capable of describing or classifying object 184. For example, object type 858 may refer to a data type of object 184. In the illustrated example, record 860a contains object type 858 of "WebEdit." Object type 858 of "WebEdit" may signify an object that is an editable text box on a web page. As another example, record 860b contains object type 858 of "Image." Object type 858 of "image" may signify a particular object which is a computer image in application under test 180.

Figure 9:
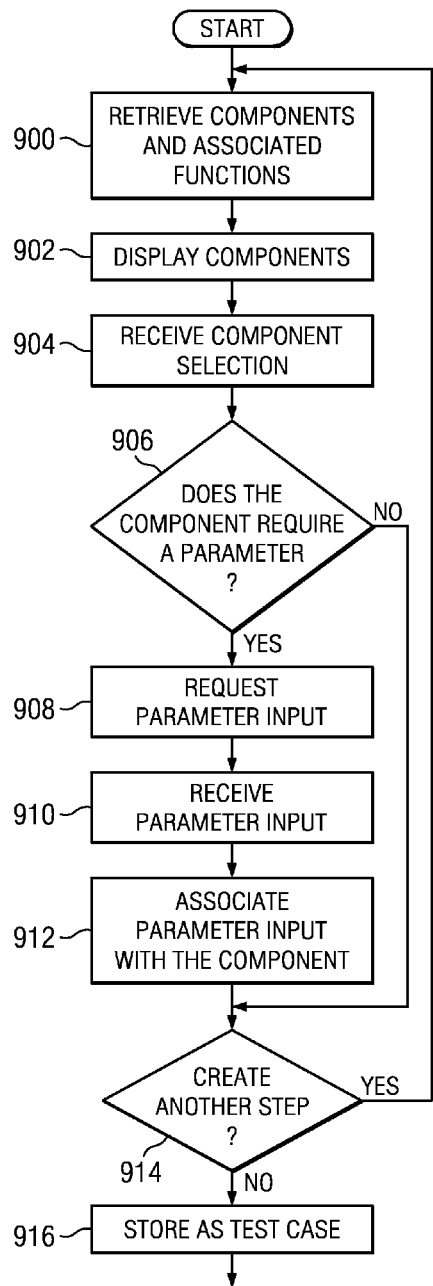
FIG. 9 illustrates an example method for creating a test case file using components.

FIG. 9 illustrates an example method for creating a test case file using components. The example method of FIG. 9 may be performed by the example application test system 100 of FIG. 1 according to certain embodiments of the presence of disclosure. The method may be implemented in any suitable combination of software, firmware, and hardware. Although particular components may be identified as performing particular steps, the present disclosure contemplates any suitable components performing the steps according to particular needs.

At step 900, a user may choose to use test case builder 124 to build test case file 150 using components 152. In certain embodiments, workstation 110 may communicate message 162 to functional environment 130. Message 162 may comprise a request to build test case file 150 using components 152. In response, functional environment 130 may facilitate the communication between test case builder 124 and repository 160. For example, test case builder 124 may communicate message 168 to repository 160. Message 168 may comprise a request to access components 152. In response to message 168, test case builder 124 may have access to components 152. At step 902, once test case builder 124 has access to components 152, test case builder may facilitate the presentation of components 152 on GUI 116 of workstation 110.

At step 904, a user may decide to create a first test case step of test case file 150. For example, components 152 may be presented in GUI 116 as a drop-down list, a group of radio buttons, or any other GUI component suitable for any particular purpose. In certain embodiments, a user may choose a particular component 152 by selecting it from a drop-down menu in GUI 116. In other embodiments, a user may select a particular component 152 by typing in the name of the particular component 152 in a text box in GUI 116. Workstation 110 may communicate the user's component 152 selection to functional environment 130. In certain embodiments, this selection may be communicated by message 162 over network 120.

At step 906, in response to receiving the user selection, test case builder 124 may attempt to determine whether the particular component 152 is associated with a particular input parameter 178. In certain embodiments, test case builder 124 may determine whether a particular component 152 has an input parameter requirement by communicating message 168 over network 190 to repository 160. Message 168 may comprise a request to access input parameters 178. In response, test case builder 124 may have access to input parameters 178. Test case builder 124 may use the information associated with input parameters 178, information associated with component 152, or any other information suitable for a particular purpose to determine whether component 152 is associated with a parameter requirement. If test case builder 124 determines that component 152 is associated with a parameter requirement, the example method may proceed to step 908. Otherwise, the example method may proceed to step 914.

At step 908, if test case builder 124 determines that a parameter is associated with the selected component 152, test case builder 124 may facilitate the presentation of a request for input parameter 178 on GUI 116 of workstation 110. At step 910, the user may enter user input to be associated with input parameter 178. For example, GUI 116 may present a text box for parameter input to the user. The user may type in user input into the text box. In response to the user entering user input, workstation 110 may communicate the user input to functional environment 130. For example, workstation 110 may communicate user input via message 162 over network 120.

At step 912, after test case builder 124 receives user input, it may facilitate the association of the user input to the selected component 152 and input parameter 178. For example, test case builder 124 may create test case file 150 and associate component 152, input parameter 178, and the user input in test case file 150. As another example, test case builder 124 may communicate message 166 over network 190 to test case files 150. Message 166 comprising a request to access a particular test case file 150. In response, test case builder 124 may access a particular test case file 150. Test case builder 124 may then associate component 152 with input parameter 178 and the received user input.

Once component information is stored in test case file 150, a user may indicate the creation of a new test case step at step 914. In response, the example method may proceed to step 900 where test case builder 124 may facilitate GUI 116 to present the user with components 152. If the user indicates no more test case steps will be created, the example method may proceed to step 916 where test case builder 124 may store test case file 150 along with other test case files 150. In certain embodiments, the user may indicate to test case builder 124 that test case file 150 may be stored in a location different than the location of other test case files 150. In such embodiments, test case builder 124 may store test case file 150 in that particular location.

Figure 10:
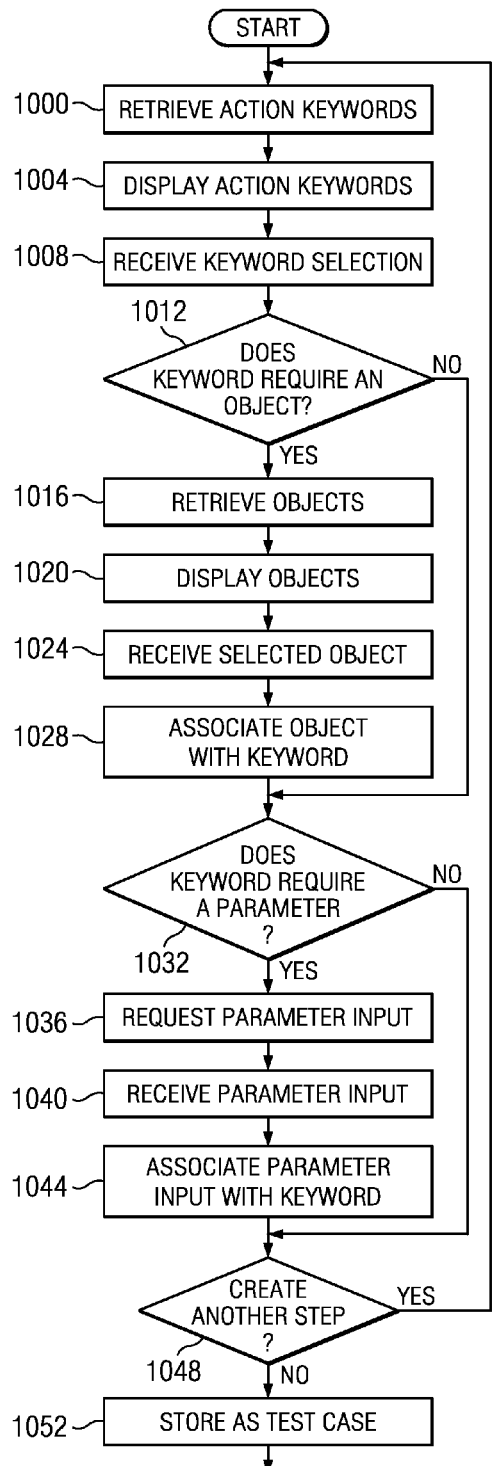
FIG. 10 illustrates an example method for creating a test case file using action keywords.

FIG. 10 illustrates an example method for creating a test case file using action keywords. The example method of FIG. 10 may be performed by the example application test system 100 of FIG. 1 according to certain embodiments of the presence of disclosure. The method may be implemented in any suitable combination of software, firmware, and hardware. Although particular components may be identified as performing particular steps, the present disclosure contemplates any suitable components performing the steps according to particular needs.

At step 1000, a user may decide to create test case file 150 using action keywords 158. In particular, a user may be presented with GUI 116 on workstation 110 that allows the user to create a test case file 150 using action keywords 158. Test case builder 124 may communicate message 168 to repository 160. Message 168 may comprise a request to access action keywords 158. In response, test case builder may have access to action keywords 158. At step 1004, test case builder 124 may then present action keywords 158 to a user via GUI 116 of workstation 110. Action keywords 158 may be presented to the user as part of a drop-down list, group of radio buttons, or any other element of GUI 116 that allows a user to choose a particular action keyword 158 suitable for any particular purpose.

At step 1008, a user may choose to create a test case step by selecting one of the action keywords 158 presented in GUI 116. Workstation 110 may communicate the user selection to functional environment 130. In certain embodiments, the user's selection may be communicated via message 162 over network 120. At step 1012, in response to receiving message 162, test case builder 124 may determine whether object 184 is associated with action keyword 158. In certain embodiments, test case builder 124 may communicate message 168 over network 190 to repository 160. Message 168 may comprise a request to access objects 184. In response, test case builder 124 may have access to objects 184. If test case builder 124 determines object 184 is associated with action keyword 158, the example method may proceed to step 1016. Otherwise, the example method may proceed to step 1032.

At step 1016, test case builder 124 may access objects 184 and retrieve objects 184. At step 1020, test case builder 1020 facilitates the display of objects 184 in GUI 116. The user is then presented with the ability to associate a particular object 184 to a particular action keyword 158. At step 1024, once the user has made a selection of a particular object 184, workstation 110 may communicate that selection to functional environment 130 via message 162 over network 120. At step 1028, after receiving the user selection of a particular object 184, test case builder 124 may associate the particular object 184 with a particular action keyword 158 in test case file 150. The example method may then proceed to step 1032.

At step 1032, test case builder 124 may attempt to determine whether a particular action keyword 158 requires a parameter input. For example, test case builder 124 may communication message 168 to repository 160. Message 168 may comprise a request to access input parameters 178. In response to message 168, test case builder 124 may access input parameters 178. Test case builder 124 may then determine whether the selected action keyword 158 requires a particular input parameter 178. If test case builder 124 determines that the selected action keyword 158 requires a particular input parameter 178, the example method may proceed to step 1036. Otherwise, the example method may proceed to step 1048.

At step 1036, test case builder 124 may facilitate the presentation of a request for user input for input parameter 178 on GUI 116 of workstation 110. A user may then type in user input for that particular input parameter 178. At step 1040, the user may enter user input and workstation 110 may communicate that input to functional environment 130 via message 162. At step 1044, test case builder 124 may associate action keyword 158 with input parameter 178 and the user input in test case file 150. At step 1048, after creating a test case step, a user may indicate that another test case step may be created and the example method may proceed to step 1000. Otherwise, the example method may proceed to step 1052 where the user may indicate that test case file 150 should be saved.

Figure 11:
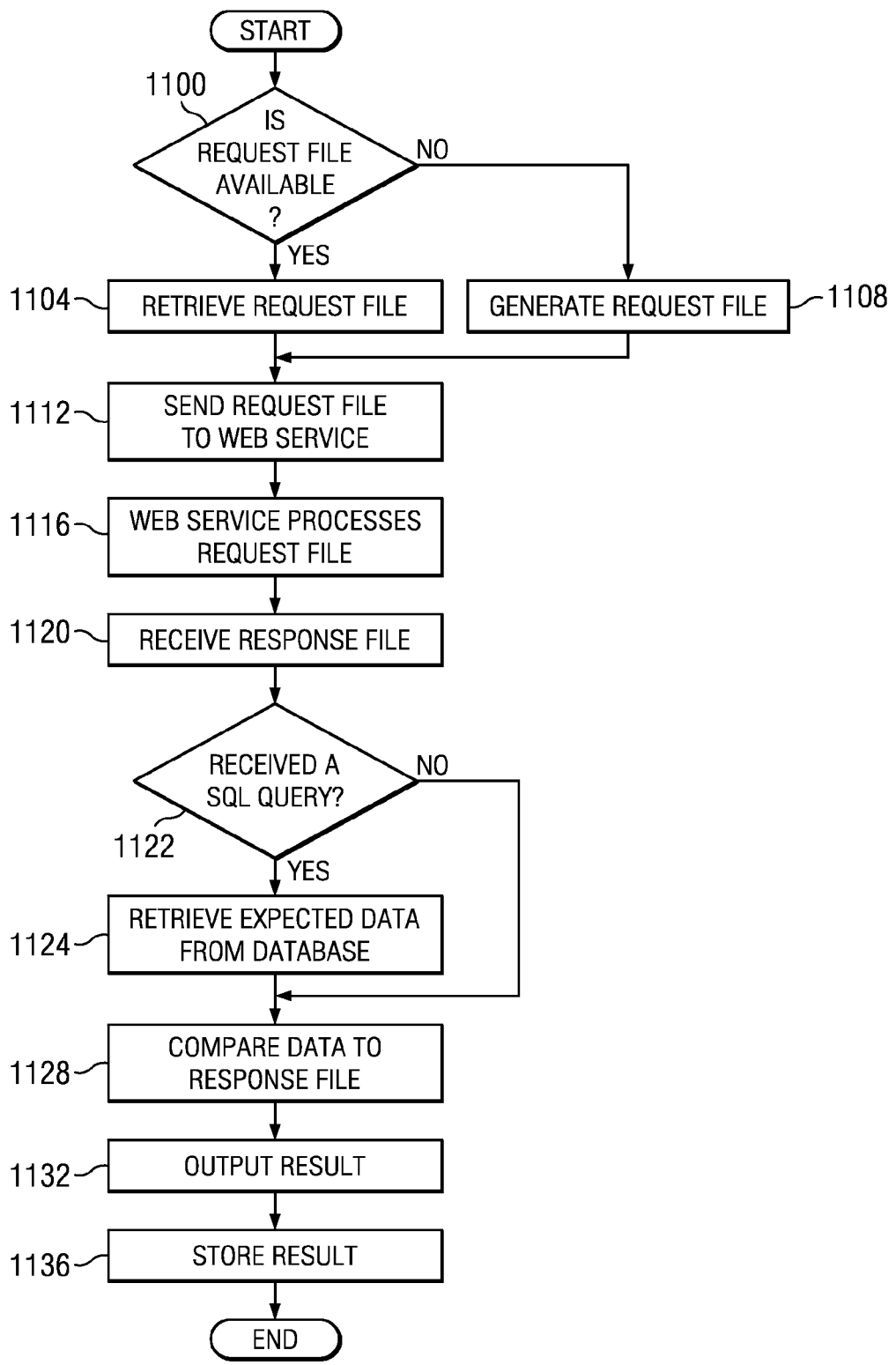
FIG. 11 illustrates an example method for executing a web services test case.

FIG. 11 illustrates an example method for executing a web services test case. The example method of FIG. 11 may be performed by the example web service environment 200 of FIG. 2 according to certain embodiments of the presence of disclosure. The method may be implemented in any suitable combination of software, firmware, and hardware. Although particular components may be identified as performing particular steps, the present disclosure contemplates any suitable components performing the steps according to particular needs.

The example method begins at step 1100. Web service environment 200 may receive input data for web service 220. Web service environment 200 determines if the specified request file 210 is available. If the specified request file 210 is available, the example method may proceed to step 1104. Otherwise, the example method may proceed to step 1108. At step 1108, web service environment 200 may use information received from GUI 116 to generate request file 210. For example, web service environment 200 may use a SQL query to retrieve data from a database stored in memory 216. The data retrieved using the SQL query can be used to generate the contents of request file 210. The example method may proceed to step 1108.

At step 1108, request file 210 is retrieved by web service environment 200. In certain embodiments request file 210 may be retrieved from memory 216. At step 1112, web service environment 200 may communicate request file 210 to web service 220. In certain embodiments, request file 210 may be communicated to web service 220 via message 202. Message 202 may include request file 210, a location of request file 210, a database SQL query, or any other information suitable for providing web service 220 input data. At step 1116, web service 220 may execute computer logic that may be stored in memory 216 to process information contained in request file 210. For example, web service 220 may be instructed by request file 210 to update sample data stored in a database. As another example, web service 220 may be instructed by request file 210 to create sample user accounts. As a further example, web service 220 may be a module for completing credit card transactions. In such an example, request file 210 may be sample credit card transactions.

At step 1120, verifier 240 may receive response file 230 generated by web service 220. For example, web service 220 may process sample credit card transactions and output the results to response file 230. In certain embodiments, web service 220 may process the information contained in request file 210 and then communicate the output data to response file 230 via message 204. Message 204 may include the contents of response file 230. Verifier 240 may communicate message 206 requesting access to response file 230. In response to message 206, verifier 240 may gain access to response file 230.

At step 1122, verifier 240 may determine if it has received an input SQL query. For example, input SQL query may be communicated to verifier 240 from GUI 116 via message 162. The input SQL query may signify a particular set of data a user wants to use for comparison. If verifier 240 has received an input SQL query, the example method may proceed to step 1124. Otherwise, it may be an indication that verifier 240 already has retrieved expected data and the example method may proceed to step 1128. At step 1124, expected data 250 may be data in a database. In such an example, verifier 240 may communicate message 208 to expected data 250. Message 208 may comprise the input SQL query requesting certain data from expected data 250.

At step 1128, verifier 240 may prepare to compare the information contained in response file 230 to expected data 250. In certain embodiments, verifier 240 may prepare to conduct this comparison by accessing data mapping file 270. In certain embodiments, verifier 240 may communicate message 218. Message 218 may comprise a request to access data mapping file 270. In response to message 218, verifier 240 may gain access to data mapping file 270. After having access to data mapping file 270, verifier 240 will be able to compare information contained in response file 230 to expected data 250. Verifier 240 may use data mapping file 270 to determine which portions of response file 230 correspond to portions of expected data 250. After determining which portions of response file 230 correspond to expected data 250, verifier 240 may then compare the data. Verifier 240 may determine whether the data in response file 230 successfully matches expected data 250. At step 1132, verifier 240 may record the result of its verification. In particular, verifier 240 may communicate message 212 to output manager 260. Message 212 may comprise the results of the comparison between data in response file 230 and data in expected data 250 conducted by verifier 240. At step 1136, output manager 260 may store the result of verifier 240's comparison in memory 216.

Although the present disclosure describes or illustrates particular operations as occurring in a particular order, the present disclosure contemplates any suitable operations occurring in any suitable order. Moreover, the present disclosure contemplates any suitable operations being repeated one or more times in any suitable order. Although the present disclosure describes or illustrates particular operations as occurring in sequence, the present disclosure contemplates any suitable operations occurring at substantially the same time, where appropriate. Any suitable operation or sequence of operations described or illustrated herein may be interrupted, suspended, or otherwise controlled by another process, such as an operating system or kernel, where appropriate. The acts can operate in an operating system environment or as stand-alone routines occupying all or a substantial part of the system processing.

Although the present disclosure has been described with several embodiments, diverse changes, substitutions, variations, alterations, and modifications may be suggested to one skilled in the art, and it is intended that the disclosure encompass all such changes, substitutions, variations, alterations, and modifications as fall within the spirit and scope of the appended claims.

What is claimed is:

1. A system comprising:
a memory; and
a processor communicatively coupled to the memory, the processor operable to:
generate a test case file by:
receiving a selection of a first component from a plurality of components, wherein the first component represents a first at least one test action;
determining that a first input parameter is associated with the first component and that a particular hint is associated with the first input parameter;
communicating a message to a repository, the message comprising a request to access the particular hint;
accessing the particular hint;
displaying the hint to a user, the hint comprising a message explaining to the user certain details about the first input parameter that guide the user to choose a particular input parameter;
receiving a selection of a second component from the plurality of components, wherein the second component represents a second at least one test action; and
determining a first instruction associated with the first component and a second instruction associated with the second component, the first and second instructions corresponding to computer logic for executing the first and second at least one test actions;
receive a location for sample input data, the location for sample input data indicated in the test case file;
retrieve the sample input data from the location;
execute a web service, the web service processing the sample input data;
receive sample output data, the sample output data generated by the web service;
retrieve expected data, the expected data comprising valid output data generated for each of a plurality of test case steps performed during a correct processing of the sample input data by the web service;
retrieve data mapping information, the data mapping information associating a first data element from the sample output data with a second data element from the expected data associated with a particular step of the plurality of test case steps;
compare the first data element from the sample output data generated by the web service to the second data element from the expected data associated with the particular step when generated during the correct processing of the sample input data by the web service; and
store a result of the comparison of the sample output data to the expected data.

2. The system of claim 1, wherein retrieving data mapping information comprises receiving a second location for the data mapping information.

3. The system of claim 1, wherein the first data element corresponds to a first portion of data, wherein the first portion is from the sample output data.

4. The system of claim 1, wherein the second data element corresponds to a second portion of data, wherein the second portion is from the expected data.

5. The system of claim 1, wherein comparing the sample output data comprises determining whether the expected data matches the sample output data.

6. The system of claim 5, wherein comparing the sample output data further comprises determining a failure reason in response to determining the expected data failed to match the sample output data.

7. The system of claim 1, wherein comparing the sample output data comprises receiving at least one comparison database query.

8. The system of claim 1, wherein receiving the sample output data generated by the web service comprises extracting a portion of content of an Extensible Markup Language file.

9. The system of claim 1, wherein the sample input data is a portion of content of an Extensible Markup Language file.

10. The system of claim 1, wherein the sample input data is based at least in part on a Structured Query Language string.

11. A method comprising:
generating a test case file by:
receiving a selection of a first component from a plurality of components, wherein the first component represents a first at least one test action;
determining that a first input parameter is associated with the first component and that a particular hint is associated with the first input parameter;
communicating a message to a repository, the message comprising a request to access the particular hint;
accessing the particular hint;
displaying the hint to a user, the hint comprising a message explaining to the user certain details about the first input parameter that guide the user to choose a particular input parameter;
receiving a selection of a second component from the plurality of components, wherein the second component represents a second at least one test action; and
determining a first instruction associated with the first component and a second instruction associated with the second component, the first and second instructions corresponding to computer logic for executing the first and second at least one test actions;
receiving a location for sample input data;
retrieving the sample input data from the location;
executing a web service, the web service processing the sample input data;
receiving sample output data, the sample output data generated by the web service;
retrieving expected data, the expected data comprising valid output data generated for each of a plurality of test case steps performed during a correct processing of the sample input data by the web service;
retrieving data mapping information, the data mapping information associating a first data element from the sample output data with a second data element from the expected data associated with a particular step of the plurality of test case steps;
comparing the first data element from the sample output data generated by the web service to the second data element from the expected data associated with the particular step when generated during the correct processing of the sample input data by the web service; and
storing a result of the comparison of the sample output data to the expected data.

12. The method of claim 11, wherein retrieving data mapping information comprises receiving a second location for the data mapping information.

13. The method of claim 11, wherein the first data element corresponds to a first portion of data, wherein the first portion is from the sample output data.

14. The method of claim 11, wherein the second data element corresponds to a second portion of data, wherein the second portion is from the expected data.

15. The method of claim 11, wherein comparing the sample output data comprises determining whether the expected data matches the sample output data.

16. The method of claim 15, wherein comparing the sample output data further comprises determining a failure reason in response to determining the expected data failed to match the sample output data.

17. The method of claim 11, wherein comparing the sample output data comprises receiving at least one comparison database query.

18. The method of claim 11, wherein receiving the sample output data generated by the web service comprises extracting a portion of content of an Extensible Markup Language file.

19. The method of claim 11, wherein the sample input data is a portion of content of an Extensible Markup Language file.

20. The method of claim 11, wherein the sample input data is based at least in part on a Structured Query Language string.

21. One or more non-transitory computer-readable media comprising logic, the logic when executed by one or more processors operable to perform operations comprising:
   generating a test case file by:
      receiving a selection of a first component from a plurality of components, wherein the first component represents a first at least one test action;
      determining that a first input parameter is associated with the first component and that a particular hint is associated with the first input parameter;
      communicating a message to a repository, the message comprising a request to access the particular hint;
      accessing the particular hint;
      displaying the hint to a user, the hint comprising a message explaining to the user certain details about the first input parameter that guide the user to choose a particular input parameter;
      receiving a selection of a second component from the plurality of components, wherein the second component represents a second at least one test action; and
      determining a first instruction associated with the first component and a second instruction associated with the second component, the first and second instructions corresponding to computer logic for executing the first and second at least one test actions;
   receiving a location for sample input data;
   retrieving the sample input data from the location;
   executing a web service, the web service processing the sample input data;
   receiving sample output data, the sample output data generated by the web service;
   retrieving expected data, the expected data comprising valid output data generated for each of a plurality of test case steps performed during a correct processing of the sample input data by the web service;
   receiving a second location for data mapping information, the data mapping information associating a first data element from the sample output data with a second data element from the expected data, wherein the first data element corresponds to a first portion of data in the sample output data and the second data element corresponds to a second portion of data from the expected data associated with a particular step of the plurality of test cast steps;
   retrieving the data mapping information from the second location;
   comparing the first data element from the sample output data generated by the web service to the second data element from the expected data associated with the particular step when generated during the correct processing of the sample input data by the web service; and
   storing a result of the comparison of the sample output data to the expected data.

* * * * *